United States Patent
Glunz

(10) Patent No.: US 12,216,966 B2
(45) Date of Patent: Feb. 4, 2025

(54) METHOD AND SYSTEM FOR AUTOMATICALLY HOSTING, INDEXING, SEARCHING AND DISTRIBUTING CONSTRUCTION DETAILS

(71) Applicant: Benjamin F. Glunz, Elgin, IL (US)

(72) Inventor: Benjamin F. Glunz, Elgin, IL (US)

(73) Assignee: Anguleris Technologies, LLC, Elgin, IL (US)

( * ) Notice: Subject to any disclaimer, the term of this patent is extended or adjusted under 35 U.S.C. 154(b) by 955 days.

(21) Appl. No.: 17/239,783

(22) Filed: Apr. 26, 2021

(65) Prior Publication Data
US 2022/0343036 A1    Oct. 27, 2022

(51) Int. Cl.
*G06F 30/13*      (2020.01)
*G06F 30/12*      (2020.01)
*G06Q 10/0633*    (2023.01)
*G06Q 30/0601*    (2023.01)
*G06F 111/02*     (2020.01)
*G06F 111/20*     (2020.01)

(52) U.S. Cl.
CPC .............. *G06F 30/13* (2020.01); *G06F 30/12* (2020.01); *G06Q 10/0633* (2013.01); *G06F 2111/02* (2020.01); *G06F 2111/20* (2020.01); *G06Q 30/0603* (2013.01)

(58) Field of Classification Search
None
See application file for complete search history.

(56) References Cited

U.S. PATENT DOCUMENTS

| | | | |
|---|---|---|---|
| 5,819,086 A * | 10/1998 | Kroenke | G06F 16/284 715/764 |
| 7,019,740 B2 * | 3/2006 | Georgalas | G06F 9/465 707/999.1 |
| 7,295,955 B2 | 11/2007 | Sit | |
| 7,949,690 B2 | 5/2011 | McArdle et al. | |
| 8,427,473 B2 | 4/2013 | Elsberg et al. | |
| 8,463,765 B2 | 6/2013 | Lesavich | |
| 8,484,231 B2 | 7/2013 | Li et al. | |
| 8,558,658 B2 | 10/2013 | Kumar et al. | |

(Continued)

FOREIGN PATENT DOCUMENTS

WO  PCT/US2015/047229   11/2015
WO  WO2016/033345 A1    3/2016

*Primary Examiner* — Akash Saxena
(74) *Attorney, Agent, or Firm* — Lesavich High-Tech Law Group, S.C .; Stephen Lesavich

(57) ABSTRACT

A method and system for automatically hosting, indexing, searching and distributing of construction details in modeling program workflows. Product component attributes, one or more indexes and plural different kinds of links are created to allow construction details to be organized, located and searched. The component attributes, one or more indexes and plural different kinds links allow a first, electronic one-to-many, general-to-specific, choice pathway and a second electronic many-to-one, specific-to-general, choice pathway to locate, view, download and distribute construction details from a web-site or directly within a three-dimensional (3D) or other dimensional modeling program. The one or more indexes and plural different kinds of links also include links from the components in a construction detail to actual physical product information such as product sheets.

21 Claims, 17 Drawing Sheets

(56) References Cited

U.S. PATENT DOCUMENTS

| | | |
|---|---|---|
| 8,606,554 B2 | 12/2013 | Zimmermann et al. |
| 8,793,790 B2 | 7/2014 | Khurana et al. |
| 9,037,564 B2 | 5/2015 | Lesavich et al. |
| 9,137,250 B2 | 9/2015 | Lesavich et al. |
| 9,361,479 B2 | 6/2016 | Lesavich et al. |
| 9,390,201 B2 * | 7/2016 | Rameau .................. G06F 30/00 |
| 9,400,902 B2 | 7/2016 | Schoner |
| 9,569,771 B2 | 2/2017 | Lesavich et al. |
| 9,782,936 B2 | 10/2017 | Glunz et al. |
| 9,817,922 B2 | 11/2017 | Glunz et al. |
| 10,867,282 B2 | 12/2020 | Glunz |
| 10,949,805 B2 | 3/2021 | Glunz |
| 10,997,553 B2 | 5/2021 | McLinden et al. |
| 11,243,919 B2 * | 2/2022 | Bartlett ................ G06F 16/254 |
| 11,321,791 B1 * | 5/2022 | Krause .................... G06F 30/13 |
| 11,475,176 B2 | 10/2022 | Glunz |
| 11,900,020 B2 * | 2/2024 | Schwartz ............... G06F 3/0482 |
| 2002/0035555 A1 | 3/2002 | Wheeler ................. G06F 16/21 |
| 2002/0077921 A1 * | 6/2002 | Morrison ........... G06Q 30/0601 |
| | | 705/26.1 |
| 2005/0081161 A1 | 4/2005 | Macinnes |
| 2006/0100722 A1 * | 5/2006 | Bell ........................ G06F 30/13 |
| | | 700/59 |
| 2006/0136179 A1 | 6/2006 | Sit |
| 2008/0059220 A1 | 3/2008 | Roth et al. |
| 2008/0109330 A1 * | 5/2008 | Torres .................... G06Q 10/06 |
| | | 705/29 |
| 2008/0249756 A1 | 10/2008 | Chaisuparasmikul |
| 2008/0281573 A1 | 11/2008 | Seletsky et al. |
| 2009/0125283 A1 | 5/2009 | Conover |
| 2009/0132576 A1 * | 5/2009 | Miller ................. G06F 16/2456 |
| | | 707/999.102 |
| 2009/0292509 A1 | 11/2009 | Thompson et al. |
| 2010/0070241 A1 | 3/2010 | Opdahl et al. |
| 2010/0110071 A1 | 5/2010 | Elsberg et al. |
| 2010/0214284 A1 * | 8/2010 | Rieffel .................... G06T 17/00 |
| | | 382/154 |
| 2010/0280836 A1 | 11/2010 | Lu et al. |
| 2011/0054652 A1 | 3/2011 | Heil |
| 2011/0055751 A1 * | 3/2011 | Morrison ........... G06Q 30/0601 |
| | | 715/777 |
| 2011/0071805 A1 | 3/2011 | Pendyala et al. |
| 2011/0093424 A1 | 4/2011 | Zimmermann et al. |
| 2011/0133884 A1 | 6/2011 | Kumar et al. |
| 2011/0208710 A1 | 8/2011 | Lesavich et al. |
| 2011/0218777 A1 | 9/2011 | Chen et al. |
| 2011/0285851 A1 | 11/2011 | Plocher et al. |
| 2011/0288672 A1 * | 11/2011 | Cunney .............. G05B 19/4093 |
| | | 700/107 |
| 2011/0307281 A1 | 12/2011 | Creveling et al. |
| 2012/0203806 A1 | 8/2012 | Panushev |
| 2012/0215500 A1 | 8/2012 | Ciuti et al. |
| 2012/0265707 A1 | 10/2012 | Bushnell |
| 2012/0278622 A1 | 11/2012 | Lesavich et al. |
| 2012/0284596 A1 | 11/2012 | Bushnell et al. |
| 2012/0296609 A1 | 11/2012 | Khan et al. |
| 2012/0296610 A1 | 11/2012 | Hailemariam et al. |
| 2012/0310906 A1 | 12/2012 | Miller et al. |
| 2013/0013265 A1 | 1/2013 | Narayan et al. |
| 2013/0082101 A1 | 4/2013 | Omansky et al. |
| 2013/0091539 A1 | 4/2013 | Khurana et al. |
| 2013/0125029 A1 | 5/2013 | Trimbl |
| 2013/0144746 A1 | 6/2013 | Phung |
| 2013/0155058 A1 | 6/2013 | Golparvar-Fard |
| 2013/0179207 A1 | 7/2013 | Perez Rodriguez |
| 2013/0182103 A1 | 7/2013 | Lee et al. |
| 2013/0185024 A1 | 7/2013 | Mahasenan et al. |
| 2013/0235029 A1 | 9/2013 | Keough et al. |
| 2013/0257850 A1 | 10/2013 | Chen et al. |
| 2013/0303193 A1 | 11/2013 | Pallavi |
| 2013/0307682 A1 | 11/2013 | Jerhotova et al. |
| 2013/0314210 A1 | 11/2013 | Schoner et al. |
| 2013/0314232 A1 | 11/2013 | Jerhotova et al. |
| 2013/0335413 A1 | 12/2013 | Wang et al. |
| 2014/0039845 A1 | 2/2014 | Saban et al. |
| 2014/0089209 A1 | 3/2014 | Akcamete et al. |
| 2014/0189792 A1 | 7/2014 | Lesavich et al. |
| 2014/0192159 A1 | 7/2014 | Chen et al. |
| 2014/0207774 A1 | 7/2014 | Walter et al. |
| 2014/0214215 A1 | 7/2014 | Han et al. |
| 2014/0304107 A1 | 10/2014 | Clarke |
| 2015/0248502 A1 | 9/2015 | Glunz et al. |
| 2015/0317331 A1 * | 11/2015 | Thomas ............... G06F 16/256 |
| | | 707/792 |
| 2015/0379301 A1 | 12/2015 | Lesavich et al. |
| 2016/0188686 A1 * | 6/2016 | Hopkins ................. G06F 16/93 |
| | | 707/602 |
| 2016/0321654 A1 | 11/2016 | Lesavich et al. |
| 2017/0132567 A1 | 5/2017 | Glunz et al. |
| 2017/0132568 A1 | 5/2017 | Glunz et al. |
| 2018/0330420 A1 * | 11/2018 | Staats ................ G06Q 30/0627 |
| 2020/0134560 A1 | 4/2020 | McLinden et al. |
| 2020/0134745 A1 | 4/2020 | McLinden et al. |
| 2020/0380080 A1 | 12/2020 | Glunz |
| 2021/0073433 A1 * | 3/2021 | Austern ................... G06F 30/13 |
| 2022/0343036 A1 * | 10/2022 | Glunz ...................... G06F 30/12 |

* cited by examiner

FIG. 8B (A)

THE PRODUCT MANAGEMENT APPLICATION SERVICE CREATES A FIRST SET OF ELECTRONIC INDEXES WITH THE CREATED SET OF PLURAL CONSTRUCTION DETAIL ATTRIBUTES TO QUICKLY, EFFICIENTLY AND EFFECTIVELY LOCATE AND ACCESS, ONE OR MORE OF THE RECEIVED PLURAL CONSTRUCTION DETAIL COMPONENTS. THE FIRST OF SET OF ELECTRONIC INDEXES INCLUDING A FIRST SET OF ELECTRONIC LINKS TO SELECTED ONES OF THE ELECTRONIC VOCABULARY, TAXONOMY, THESAURUS AND GRAPHICAL OBJECT TERMS IN CREATED SET OF PLURAL CONSTRUCTION DETAIL ATTRIBUTES STARTING AT ONE OR MORE FIRST GENERAL TERM LEVELS, LINKING TO ONE OR MORE INTERMEDIATE TERM LEVELS AND LINKING TO ONE OR MORE SPECIFIC TERM LEVELS, THEREBY PROVIDING A FIRST, ONE-TO-MANY, GENERAL-TO-SPECIFIC, ELECTRONIC PATHWAY FOR LOCATING AND SELECTING ONE OR MORE, FIRST, SPECIFIC DESIRED CONSTRUCTION DETAIL COMPONENTS ⎯142

THE PRODUCT MANAGEMENT APPLICATION SERVICE CREATES A SECOND SET OF ELECTRONIC INDEXES WITH CREATED SET OF PLURAL CONSTRUCTION DETAIL ATTRIBUTES TO QUICKLY, EFFICIENTLY AND EFFECTIVELY ACCESS, OTHER ONES ONE OR MORE OF THE RECEIVED PLURAL CONSTRUCTION DETAIL COMPONENTS, THE SECOND OF SET OF ELECTRONIC INDEXES INCLUDING A SECOND SET OF ELECTRONIC LINKS TO OTHER SELECTED ONES OF THE ELECTRONIC VOCABULARY, TAXONOMY, THESAURUS TERMS AND GRAPHICAL OBJECT TERMS IN THE CREATED SET OF PLURAL CONSTRUCTION DETAIL ATTRIBUTES STARTING AT ONE OR MORE SECOND SPECIFIC TERM LEVELS, LINKING TO ONE OR MORE INTERMEDIATE TERM LEVELS AND LINKING TO ONE OR MORE GENERAL TERM LEVELS, THEREBY PROVIDING A SECOND, MANY-TO-ONE, SPECIFIC-TO-GENERAL, ELECTRONIC PATHWAY FOR LOCATING AND SELECTING ONE OR MORE SECOND, GENERAL DESIRED CONSTRUCTION DETAIL COMPONENTS ⎯144

THE PRODUCT MANAGEMENT APPLICATION SERVICE CREATES A THIRD SET OF ELECTRONIC INDEXES WITH CREATED SET OF PLURAL CONSTRUCTION DETAIL ATTRIBUTES TO QUICKLY, EFFICIENTLY AND EFFECTIVELY ACCESS, ELECTRONIC PRODUCT INFORMATION FOR PLURAL ACTUAL PHYSICAL PRODUCTS ASSOCIATED WITH THE ONE OR MORE OF THE RECEIVED PLURAL CONSTRUCTION DETAIL COMPONENTS, THE THIRD OF SET OF ELECTRONIC INDEXES INCLUDING A THIRD SET OF ELECTRONIC LINKS TO YET OTHER SELECTED ONES OF THE ELECTRONIC VOCABULARY, TAXONOMY, THESAURUS AND GRAPHICAL OBJECT TERMS IN THE CREATED SET OF PLURAL CONSTRUCTION DETAIL ATTRIBUTES STARTING AT A PLURAL DIFFERENT GENERAL TERM LEVELS, INTERMEDIATE TERM LEVELS AND SPECIFIC TERM LEVELS, THEREBY PROVIDING A THIRD, PATHWAY FOR LOCATING AND SELECTING ONE OR MORE ACTUAL PHYSICAL PRODUCTS ASSOCIATED WITH THE ONE OR MORE OF THE RECEIVED PLURAL CONSTRUCTION DETAIL COMPONENTS — 146

↓

THE PROJECT MANAGEMENT APPLICATION HOSTS VIA THE COMMUNICATIONS NETWORK FOR ONE OR MORE OTHER NETWORK DEVICES EACH WITH ONE OR MORE OTHER PROCESSORS, THE CREATED FIRST, SECOND AND THIRD SET OF ELECTRONIC INDEXES THEREBY PROVIDING THE FIRST, ONE-TO-MANY, GENERAL-TO-SPECIFIC, ELECTRONIC PATHWAY AND THE SECOND, MANY-TO-ONE, SPECIFIC-TO-GENERAL, ELECTRONIC PATHWAY FOR LOCATING AND SELECTING ONE OR MORE CONSTRUCTION DETAIL COMPONENTS AND THE THIRD ELECTRONIC PATHWAY FOR LOCATING AND SELECTING ONE OR MORE ACTUAL PHYSICAL PRODUCTS ASSOCIATED WITH THE ONE OR MORE OF THE RECEIVED PLURAL CONSTRUCTION DETAIL COMPONENTS, OUTSIDE OF, OR DIRECTLY WITHIN THE XD MODELING PROGRAM — 148

↓

( END )

METHOD AND SYSTEM FOR AUTOMATICALLY HOSTING, INDEXING, SEARCHING AND DISTRIBUTING CONSTRUCTION DETAILS

CROSS REFERENCES TO RELATED APPICATIONS

Not applicable.

FIELD OF INVENTION

This invention relates to X-dimensional modeling programs. More specifically, it relates to a method and system for automatically hosting, indexing, searching and distributing of construction details in a XD modeling program workflow.

BACKGROUND OF THE INVENTION

Three-dimensional (3D) modeling programs include a process of developing a mathematical representation of any surface of an object in three or more dimensions via specialized software. One type of 3D modeling program is a Building Information Modeling (BIM) program.

BIM is a process including the generation and management of digital representations of physical and functional characteristics of physical spaces. BIM programs span the whole design concept-to-occupation time-span.

Current BIM software is also used by individuals, businesses and government authorities who plan, design, construct, operate and maintain diverse physical infrastructures, from water, wastewater, electricity, gas, refuse and communication utilities to roads, bridges and ports, from houses, apartments, schools and shops to offices, factories, and prisons, etc.

A BIM model enables users to understand relationships between spaces, building materials, and various systems within a physical structure. BIM software can be used for every step of the process, from planning, to design, to construction. BIM solutions let users sequence the steps and elements of the building process, including the building materials and crews needed to complete the construction.

"Construction details are companion drawings to plans, sections and elevations and are usually the largest-scale drawings found within sets. They show how building materials and systems interface and include more highly detailed dimensional criteria and material noting." *The Architects Handbook of Professional Practice*—Fifteenth Edition, pg. 681, ISBN: 978-1-118-30882-0, November 2013.

There are a number of problems with using construction details.

One problem is that architects, interior designers, engineers, etc. who use construction details have to either create their own construction details.

Another problems is that there is no central site that stores or hosts construction details. Architects, interior designers, engineers, etc. who use construction details must visit multiple sites maintained by suppliers of building and construction materials to fine construction details they are looking for. This is tedious and time consuming process.

Another problem is that construction detail information for architecture, design are not organized and available in a meaningful way from within BIM modeling programs or other modeling programs.

Another problem is that general and specific construction detail information is not searchable by keywords including "terms of art" keywords within BIM modeling programs or by graphical objects within the construction details.

Another problem is that general and specific construction detail information is not updated or kept up-to-date when information in the construction detail becomes outdated or obsolete.

Another problem is that product indexes are not created or used for organizing construction details to make them easily usable from BIM modeling programs or other modeling programs.

Another problem is that construction details are not searchable using a one-to-many, general-to-specific, choice pathway or from a many-to-one, specific-to-general, choice pathway directly from within BIM modeling programs or outside such program via a single web-site, etc.

Thus, it is desirable to solve some of the problems associated with providing construction details directly from BIM modeling programs.

SUMMARY OF THE INVENTION

In accordance with preferred embodiments of the present invention, some of the problems associated with providing and searching of construction details in modeling program workflows are overcome. A method and system for automatically hosting, indexing, searching and distributing of construction details in modeling program workflows.

Product component attributes, one or more indexes and plural different kinds of links are created to allow construction details to be organized, located and searched. The component attributes, one or more indexes and plural different kinds links allow a first, electronic one-to-many, general-to-specific, choice pathway and a second electronic many-to-one, specific-to-general, choice pathway to locate, view, download and distribute construction details from a web-site or directly within a three-dimensional (3D) or other dimensional modeling program. The one or more indexes and plural different kinds of links also include links from the components in a construction detail to actual physical product information such as product sheets.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Exemplary Electronic Information Processing and Display System

Figure 1:
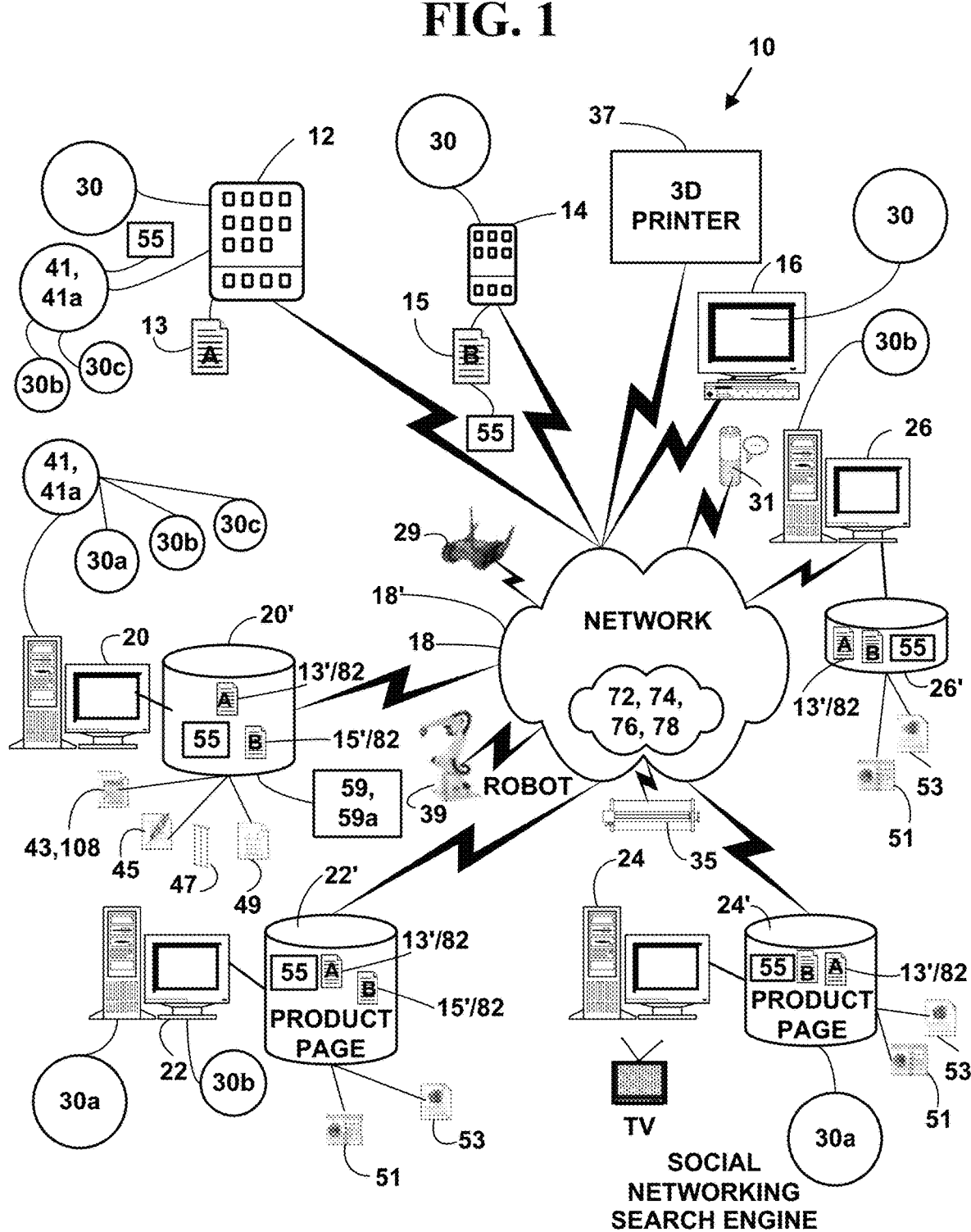
FIG. 1 is a block diagram illustrating an exemplary electronic information processing and display system.

FIG. 1 is a block diagram illustrating an exemplary electronic information display system 10 for automatically fulfilling architecture, design or construction product requests. The exemplary electronic system 10 includes, but is not limited to, one or more target network devices 12, 14, 16, etc. each with one or more processors and each with a non-transitory computer readable medium.

The one or more target network devices 12, 14, 16 (illustrated in FIG. 1 only as a table, smart phone and computer for simplicity) include, but are not limited to, desktop and laptop computers, tablet computers, mobile phones, non-mobile phones with displays, three-dimensional (3D) printers, robots, fabrication machines, smart phones, Internet phones, Internet appliances, personal digital/data assistants (PDA), cable television (CATV), satellite television (SATV) and Internet television set-top boxes, digital televisions including high definition television (HDTV), three-dimensional (3DTV) televisions, wearable network devices 94-104 (FIG. 6), unmanned ground vehicles (UGV) 29, smart speakers 31 and/or other types of network devices.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers include, but are not limited to, tablet computers such as the IPAD™, by APPLE™, Inc., the HP™ TABLET™, by HEWLETT PACKARD™, Inc., the PLAYBOOK™, by RIM™, Inc., the TABLET™, by SONY™, Inc., etc.

A "smart speaker" 31 is a type of wireless speaker and voice command device with an integrated virtual assistant that offers interactive actions and hands-free activation with the help of one "hot word" (or several "hot words"). Some smart speakers can also act as a smart device that utilizes Wi-Fi, Bluetooth and other wireless protocol standards to extend usage beyond audio playback, such as to control home automation devices. This can include, but is not limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The target network devices 12, 14, 16 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16 make requests 13, 15 for actual architecture, construction, building and/or design products via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 29, 31, 98-104 via the cloud communications network 18 and non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

One or more server network devices (e.g., 20, 22, 24, 26, etc.) store portions 13', 15' of the electronic content 13, 15 (e.g., actual product requests, etc.) as cloud storage objects 82 (FIG. 5) as is described herein.

The plural server network devices 20, 22, 24 26, may be connected to, but are not limited to, manufacturing/fabrication machines 35, 3D printers 37, robots 39, World Wide Web servers, Internet servers, search engine servers, vertical search engine servers, social networking site servers, file servers, other types of electronic information servers, and other types of server network devices (e.g., edge servers, firewalls, routers, gateways, etc.).

A manufacturing/fabrication machine 35, includes, but is not limited to machines such as waterjets, press brakes, laser systems, plasma systems, shears, grinders, lathes, mills, routers, Computer Numerical Control (CNC) machines, etc.

"CNC machining" is a manufacturing process in which pre-programmed computer software dictates the movement of factory tools and machinery. The process can be used to control a range of complex machinery, from grinders and lathes to mills and routers. CNC tools, move a cutter around a big table (X and Y axis) and move it up and down as well (Z axis) allowing it to make 3D movements and create products of all sorts of shapes and sizes.

A "3D printer" 39 include 3D printing or "Additive manufacturing." 3D printing is a process of making a three-dimensional solid object of virtually any shape from a digital model. 3D printing is achieved using an "additive process," where successive layers of material are laid down in different shapes. 3D printing is also considered distinct from traditional machining techniques, which mostly rely on the removal of material by methods such as cutting or drilling and are "subtractive" processes.

In one embodiment, a 3D printer 39 is a limited type of industrial robot that is capable of carrying out an additive process under computer control. The 3D printing technology is used for both prototyping and distributed manufacturing with applications in architecture, building (AEC), industrial design, automotive, aerospace, military, engineering, civil engineering, dental and medical industries, biotech (human tissue replacement), fashion, footwear, jewelry, eyewear, education, geographic information systems, food, and/or many other fields.

An "industrial robot" 37 is a robot system used for manufacturing. Industrial robots are automated, programmable and capable of movement on three or more axis. Typical applications of robots include welding, painting, assembly, pick and place for products, product inspection, and testing; all accomplished with high endurance, speed, and precision. They also assist in material handling.

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Electronic Content Display System

Figure 2:
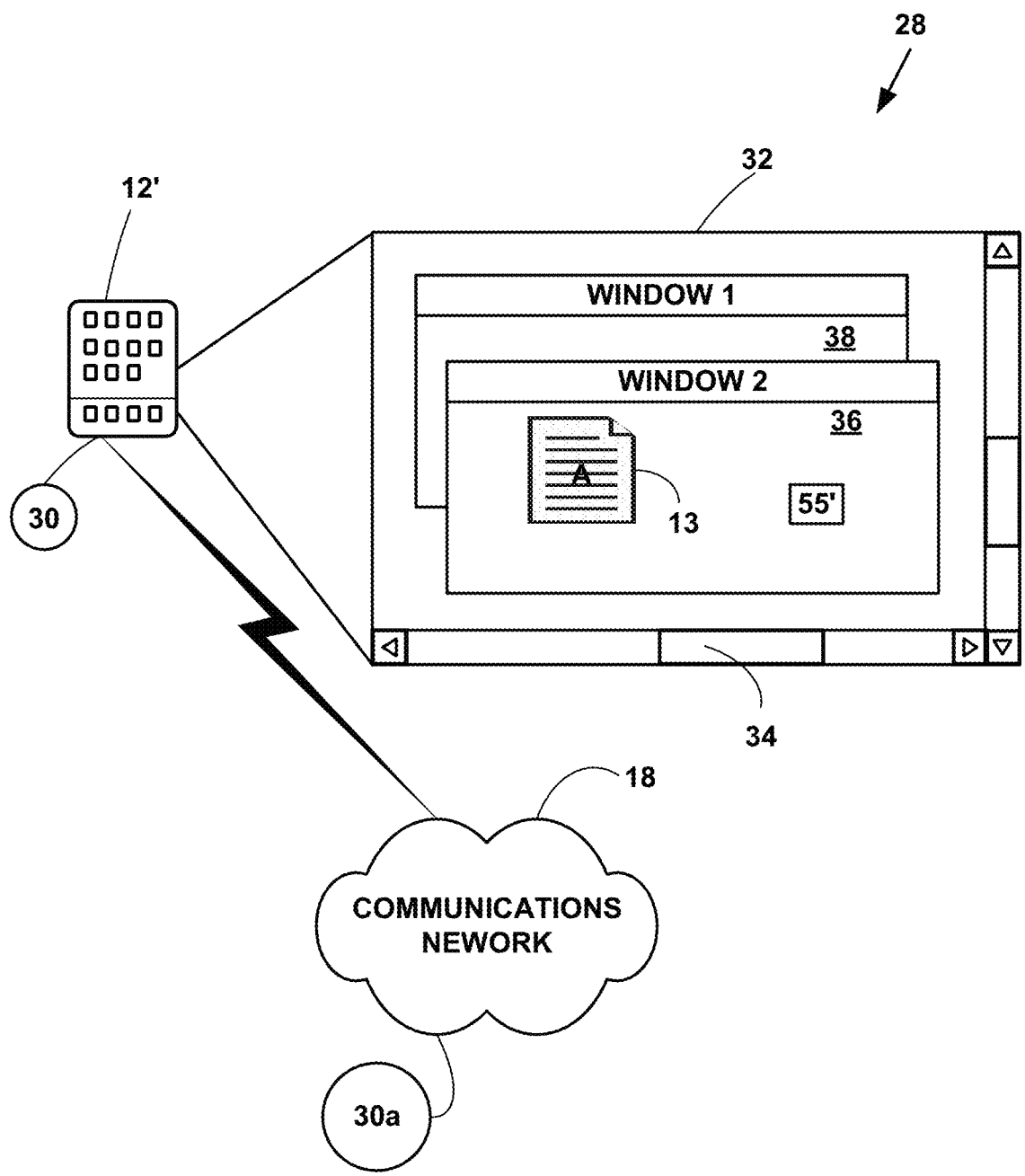
FIG. 2 is a block diagram illustrating an exemplary electronic information display system.

FIG. 2 is a block diagram illustrating an exemplary electronic content information display system 28. The exemplary electronic information system display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 is a mobile application for a smart phone, electronic tablet and/or other network device. In another embodiment, the application 30a, 30b, 30c, 30d is a cloud application used on a cloud communications network 18. However, the present invention is not limited these embodiments and other embodiments can be used to practice the invention In another embodiment, a portion of the application 30 is executing on the target network devices 12, 14, 16, 29, 31, 98-104 and another portion of the application 30a, 30b, 30c, 30d is executing on the server network devices 20, 22, 24, 26. The applications also include one or more library applications. However, the present invention is not limited these embodiments and other embodiments can be used to practice the invention.

In another embodiment, the application 30a includes a web-site service component for a non-cloud communications network 18' and/or a SaaS 64 component for a cloud communications network 18. A "web-site" is a collection of web pages written in a markup language or a programming language and related content, such as electronic text and documents, images, audio, video, etc. that is identified by a domain name and published on at least one web network server 20. A "web-site service" provides either free or paid access to the web-site via a communications network 18' such as the Internet, an intranet, etc. However, the present invention is not limited to such an embodiment and other embodiment may be used to practice the invention.

Exemplary Networking Protocol Stack

Figure 3:
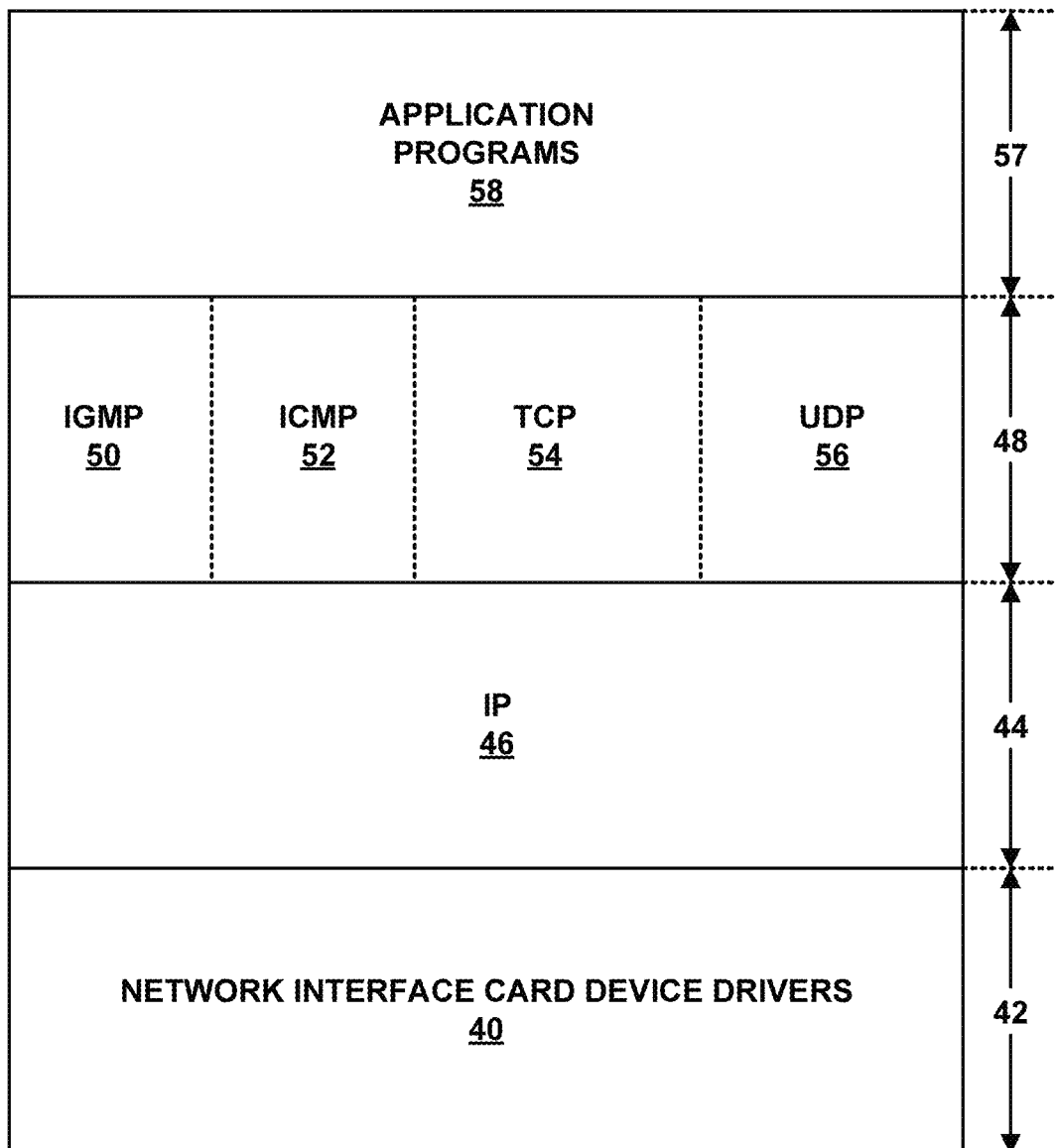
FIG. 3 is a block diagram illustrating an exemplary networking protocol stack.

FIG. 3 a block diagram illustrating a layered protocol stack 38 for network devices in the electronic information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer).

The network devices 12, 14, 16, 20, 22, 24, 26, 29, 31, 98-104 are connected to the communication network 18 with Network Interface Card (NIC) cards including device drivers 40 in a link layer 42 for the actual hardware connecting the network devices 12, 14, 16, 20, 22, 24, 26, 29, 31, 98-104 to the cloud communications network 18. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the cloud communications network 18. The MC cards have a medium access control (MAC) address that is unique to each NIC and unique across the whole cloud network 18. The Medium Access Control (MAC) protocol is used to provide a data link layer of an Ethernet LAN system and for other network systems.

Above the link layer 42 is a network layer 44 (also called the Internet Layer for Internet Protocol (IP) suites). The network layer 44 includes, but is not limited to, an IP layer 46.

IP 46 is an addressing protocol designed to route traffic within a network or between networks. However, more fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30a, 30b, 30c, 30d, etc.) to carry out desired functionality for a network device reside. For example, the application programs 58 for the client network devices 12, 14, 16, 27, 29, 31, 98-104 may include web-browsers or other application programs, application program 30, while application programs for the server network devices 20, 22, 24, 26 may include other application programs (e.g., 30a, 30b, 30c, 30d, etc.).

In one embodiment, application program 30 includes a product management application 30a, an Artificial Intelligence (AI) application 30b and/or other applications 30c. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites (e.g., Simple Mail Transfer Protocol, (SMTP), Hyper Text Transfer Protocol (HTTP), File Transfer Protocol (FTP), Dynamic Host Configuration Protocol (DHCP), DNS, etc.) and/or other protocols from other protocol suites may also be used in protocol stack 38.

In addition, markup languages such as HyperText Markup Language (HTML), EXtensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

EXtensible Markup Language (XML) is another markup language that defines a set of rules for encoding documents in a format that is both human-readable readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 20, 22, 24, 26, 29, 31, 98-104 include but are not limited to, IEEE 802.11a, 802.11b, 802.11g, 802.11n, 802.15.4 (ZigBee), "Wireless Fidelity" (Wi-Fi), "Worldwide Interoperability for Microwave Access" (WiMAX), ETSI High Performance Radio Metropolitan Area Network (HIPERMAN) or "RF Home" wireless interfaces. In another embodiment of the present invention, the wireless sensor device may include an integral or separate Bluetooth and/or infra data association (IrDA) module for wireless Bluetooth or wireless infrared communications. However, the present invention is not limited to such an embodiment and other 802.11xx and other types of wireless interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RF interfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows "scaling out" for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as "plugging in." In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 29, 31, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags 99 and/or sensor.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" is a device that measures a physical quantity and converts it into an RF signal which can be read by an observer or by an instrument (e.g., target network devices 12, 14, 16, 20, 22, 24, 26, 29, 31, 98-104, server network devices 20, 22, 24, 26, etc.)

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 20, 22, 24, 26, 29, 31, 98-104 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30*a*, 30*b*, 30*c*, 30*d* provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30*a*, 30*b*, 30*c*, 30*d* provide cloud SaaS 64 services and/or non-cloud application services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30*a*, 30*b*, 30*c*, 30*d* provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30*a*, 30*b*, 30*c*, 30*d* provide cloud SaaS 64 services and/or non-cloud application services from general search engine services. In another embodiment, the cloud applications 30, 30*a*, 30*b*, 30*c*, 30*d* provide general search engine services by interacting with one or more other public search engines (e.g., GOOGLE™, BING™, YAHOO™, etc.) and/or private search engine services.

In another embodiment, the cloud applications 30, 30a, 30b, 30c, 30d provide cloud SaaS 64 services and/or non-cloud application services from specialized search engine services, such as vertical search engine services by interacting with one or more other public vertical search engines (e.g., GALAXY. COM, etc.) and/or private search engine services.

However, the present invention is not limited to such general and/or vertical search engine services and more, fewer and/or other general search engine services can be used to practice the invention.

Social Networking Services

In one embodiment, the cloud applications 30, 30a, 30b, 30c, 30d provide cloud SaaS 64 services and/or non-cloud application services from one more social networking services including to/from one or more social networking web-sites (e.g., FACEBOOK™, YOUTUBE™, TWITTER™, INSTAGRAM™, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 29, 31, 98-104 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30a, 30b, 30c, 30d. Security and/or encryption programs may also exist in hardware components on the network devices (12, 14, 16, 20, 22, 24, 26, 29, 31, 98-104) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length<$2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPs), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference. More information on SSL is available at the domain name See "netscape.com/eng/security/SSL_2.html."

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
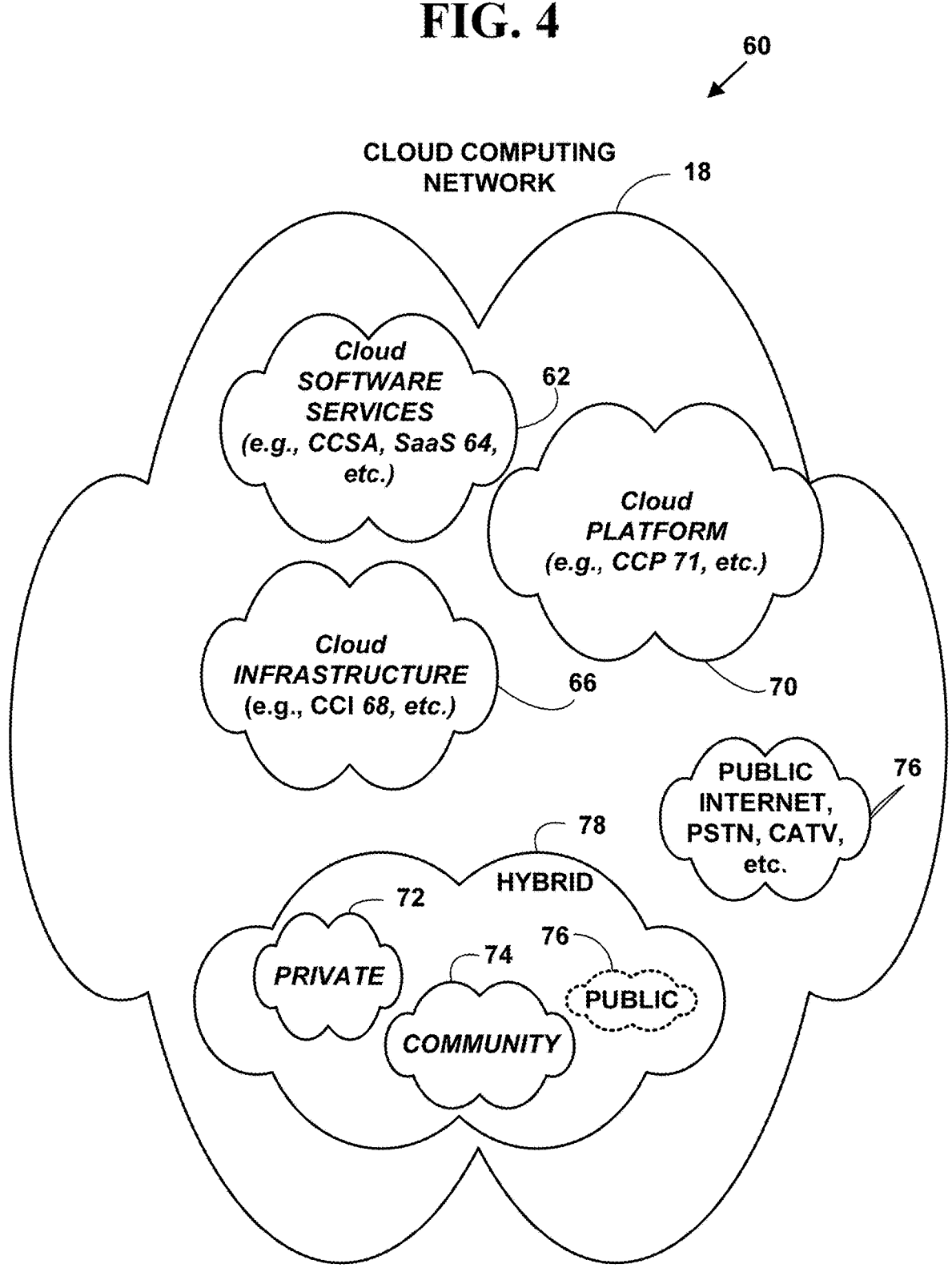
FIG. 4 is block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand automatic construction detail services. Automatic construction detail services can unilaterally provision computing capabilities, such as server time and network storage, as needed automatically without requiring human interaction with each network server on the cloud communications network 18.
2. Broadband network access. Automatic construction detail services capabilities are available over plural broadband communications networks and accessed through standard mechanisms that promote use by heterogeneous thin or thick client platforms (e.g., mobile phones, smart phones 14, tablet computers 12, laptops, PDAs, etc.). The broadband network access includes high speed network access such as 3G, 4G and 5G wireless and/or wired and broadband and/or ultra-broad band (e.g., WiMAX, etc.) network access.
3. Resource pooling. Automatic construction detail services resources are pooled to serve multiple requesters using a multi-tenant model, with different physical and virtual resources dynamically assigned and reassigned according to demand. There is location independence in that a requester of services has no control and/ or knowledge over the exact location of the provided by the automatic construction detail service resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for automatic building, construction and design product generation service collaboration. For automatic building, construction and design product generation services, multi-media collaboration converters, the automatic construction detail services collaboration and analytic conversion capabilities available for provisioning appear to be unlimited and can be used in any quantity at any time.
5. Measured Services. Cloud computing systems automatically control and optimize resource use by leveraging a metering capability at some level of abstraction appropriate to the type of automatic construction detail services (e.g., storage, processing, bandwidth, custom electronic content retrieval applications, etc.). Electronic automatic construction detail services collaboration conversion usage is monitored, controlled, and reported providing transparency for both the automatic construction detail services collaboration provider and the BIM multi-media collaboration requester of the utilized electronic content storage retrieval service.

Exemplary cloud computing service models illustrated in FIG. 4 appear in Table 2. However, the present invention is not limited to these service models and more, fewer or other service models can also be used to practice the invention.

TABLE 2

1. Cloud Computing Software Applications 62 for automatic construction detail services (CCSA, SaaS 64). The capability to use the provider's applications 30, 30a, 30b, 30c, 30d running on a cloud infrastructure 66. The cloud computing applications 62, are accessible from the server network device 20 from various client devices 12, 14, 16 through a thin client interface such as a web browser, etc. The user does not manage or control the underlying cloud infrastructure 66 including network, servers, operating systems, storage, or even individual application 30, 30a, 30b, 30c, 30d capabilities, with the possible exception of limited user-specific application configuration settings.
2. Cloud Computing Infrastructure 66 for automatic construction detail services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d. The user does not manage or control the underlying cloud infrastructure 66 but has control over operating systems, storage, deployed applications, and possibly limited control of select networking components (e.g., host firewalls, etc.).
3. Cloud Computing Platform 70 for automatic construction detail services (CCP 71). The capability provided to the user to deploy onto the cloud infrastructure 66 created or acquired applications created using programming languages and tools supported servers 20, 22, 24, TABLE 2-continued 26, etc.. The user not manage or control the underlying cloud infrastructure 66 including network, servers, operating systems, or storage, but has control over the deployed applications 30a, 30b, 30c, 30d and possibly application hosting environment configurations.

Exemplary cloud computing deployment models appear in Table 3. However, the present invention is not limited to these deployment models and more, fewer or other deployment models can also be used to practice the invention.

TABLE 3

1. Private cloud network 72. The cloud network infrastructure is operated solely for automatic construction detail services. It may be managed by the electronic content retrieval or a third party and may exist on premise or off premise.
2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise.
3. Public cloud network 76. The cloud network infrastructure such as the Internet, PSTN, SATV, CATV, Internet TV, etc. is made available to the general public or a large industry group and is owned by one or more organizations selling cloud services.
4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.)

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30a, 30b, 30c, 30d, offers cloud services for automatic building, construction and design product generation. The application 30, 30a, 30b, 30c, 30d offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for automatic construction detail services. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
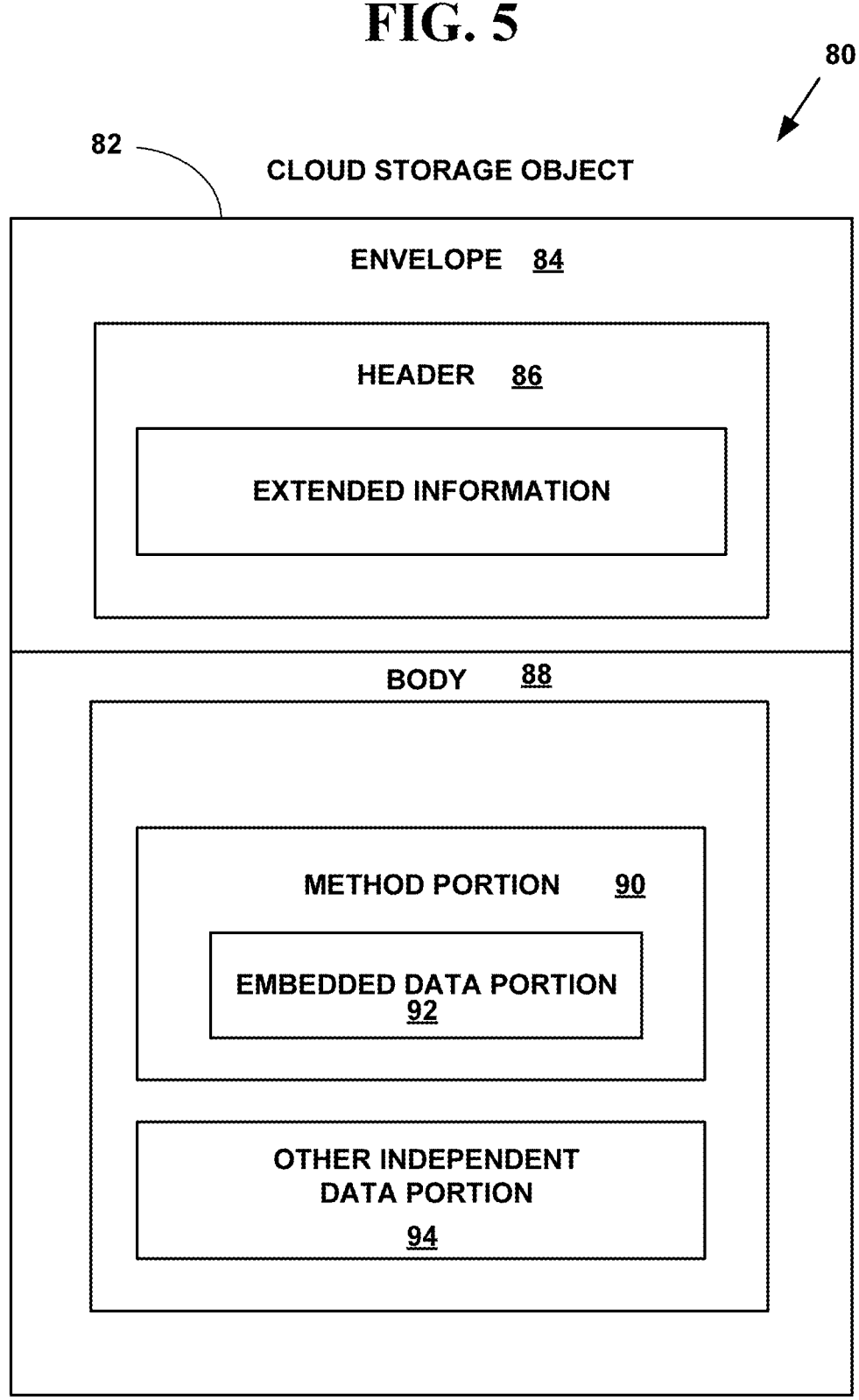
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic content 13, 15 (e.g., construction detail, product information requests, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30*a*, 30*b*, 30*c*, 30*d*.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic construction detail services in a cloud or non-cloud environment. In one embodiment, the API for automatic construction detail services is available in 3D modeling programs such as BIM programs. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
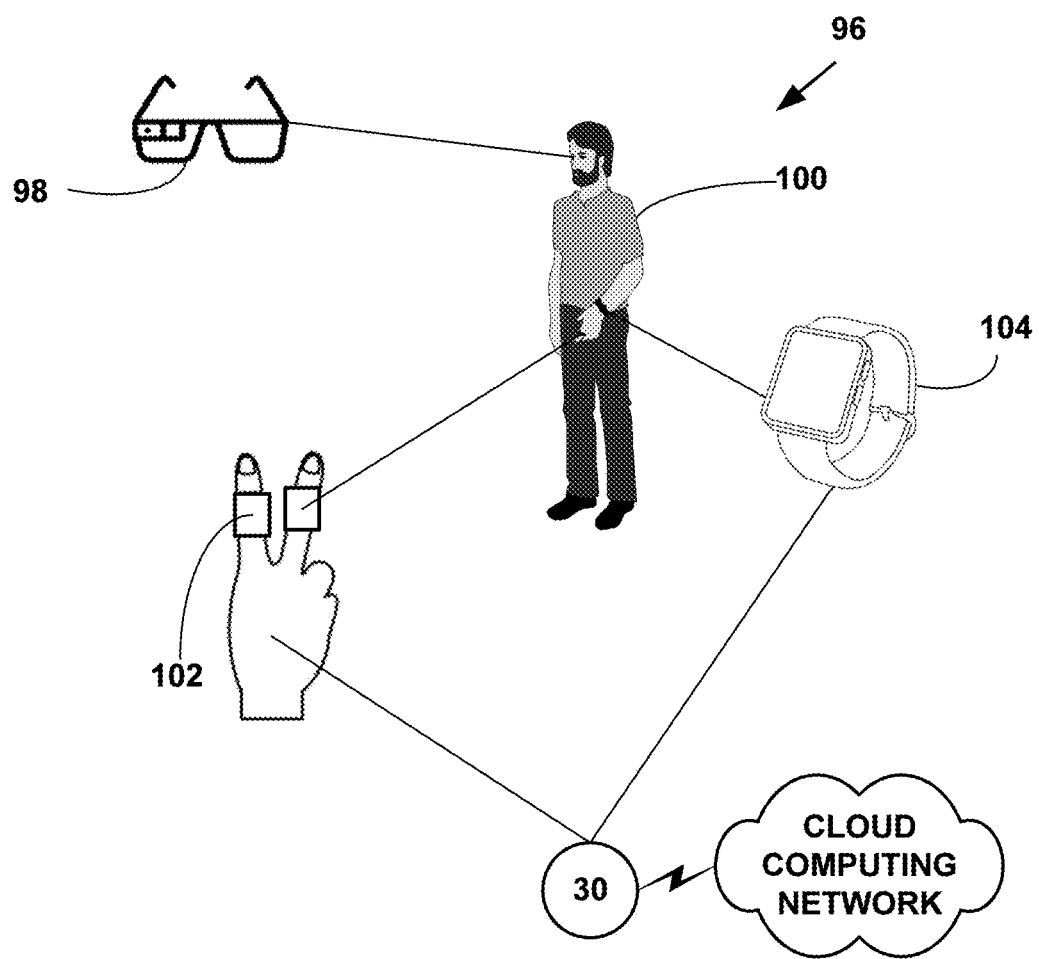
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30*a*, 30*b*, 30*c*, 30*d* interacts with wearable devices 98-104 for automatic building, construction and design product generation services the methods described herein However, the present invention is not limited this embodiment and other embodiments can also be used to practice the invention.

Unmanned Ground Vehicle (UGV)

An unmanned ground vehicle (UGV) 29, 29' is a vehicle that operates while in contact with the ground and without an onboard human presence. UGVs 29, 29' are used for many applications where it may be inconvenient, dangerous, or impossible to have a human operator present such as construction sites, etc. Generally, the UGV 29, 29' will have a set of sensors to observe the environment, and will either autonomously make decisions about its behavior or pass the information to a human operator at a different location who will control the vehicle through teleoperation. In one embodiment, the UGV 29, 29' is autonomous.

An "autonomous" UGV 29, 29' is an autonomous robot that operates without the need for a human controller. The vehicle uses its sensors to develop some limited understanding of the environment, which is then used by control algorithms to determine the next action to take in the context of a human provided mission goal. This fully eliminates the need for any human to watch over the menial tasks (e.g., requested product information, etc.) that the UGV 29, 29' is completing. In such an embodiment, the autonomous UGV 29, 29' traverses a physical site for a desired project. In such an embodiment, the physical site may be too dangerous for a human to traverse, so the UGV 29, 29' is used to traverse the physical site and make automatic product information requests.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points.

In one embodiment, the present invention uses one or more AI methods including, but are not limited to, AI knowledge-based methods for (1) automatically qualifying a requester of a product information is eligible to receive the product information; (2) automatically determining a pre-determined context of request for a product information with respect to a desired project; (3) automatically scanning a 3D modeling program and automatically generating product information requests for virtual components in the 3D modeling program for a desired project; (5) automatically determining a time series analysis for analyzing variations in product information requests from a same source (e.g., multiple e-mails at a same architecture firm, etc.) and/or different sources; (6) automatically calculating and determining trends from product information requests; (7) automatically determining multivariate tabular analysis for product information requests; However, the present invention is not limited to such an embodiment and more, fewer and/or other AI methods can be used to practice the invention.

Automatically qualifying a requester of a product information is eligible to receive the product information includes automatic AI methods for automatically reviewing electronic information collected from a requester of a product information such as is the requester an architect, builder, contractor, designer, engineer and/or a homeowner, do it yourself, etc. requester. Such an automatic method prevents any requester from requesting and receiving a large amount of product information outside the scope of a desired project. Another aspect of qualifying a requester is determine if the requester is from a large and/or important requester that may purchase a large number of actual products from a manufacturer or product supplier so the requests can receive special attention and/or additional personal follow-up from the manufacturer or product supplier. Such an automatic method also saves time for sales representatives and money for manufacturers and product suppliers as they do not have to spend time to call all requesters of product information as the requesters' eligibility to receive any requested product information is automatically determined.

For example, one exemplary AI method examines an e-mail address and/or domain name included in the electronic information collected from a requester. If the e-mail address (e.g., jane@janesmitharchitects.com, etc.) or the domain name (e.g., jonesarch.com, etc.) is from a known architect, construction, design and/or engineering firm, the AI method would deem a current requester and/or additional requesters with similar e-mail addresses and/or from the same domain name, eligible to receive product information. However, the present invention is not limited to the qualifying a requester AI method described and other AI methods can be used to practice the invention.

Automatically determining a pre-determined context of a request for a product information with respect to a desired project includes automatic AI methods for automatically determining if a requested product information is appropriate within a pre-determined context of the desired project. For example, if an engineer is working a desired project including a new bridge, the pre-determined context of the project is bridge related materials and the engineer requested information on hardwood flooring or roofing shingles, the AI methods would determine the request for the product information is not within the pre-determined context of the desired project and automatically request additional information from the engineer, to justify his/her request, etc. This AI method prevents a requester from ordering actual physical products either intentionally or unintentionally that do not fit within a pre-determined context of the desire project. Such an automatic method also saves time for sales representatives and money for manufacturers and product suppliers as they do not have to spend time to call requesters of product information and/or product ordering as the pre-determined context of the product information and product order requests to receive any requested product is automatically determined.

However, the present invention is not limited to the context of request AI method described and other AI methods can be used to practice the invention.

Automatically scanning a 3D modeling program and automatically generating product information and product order requests for virtual components in the 3D modeling program for a desired project includes automatic AI methods for automatically scanning virtual components in a 3D modeling program (e.g., BIM program, etc.) for which product information and requests have been designated for any virtual component (e.g., stud, siding, flooring, paint, roofing, etc.) in the 3D modeling program. The product information and fulfillments requests are activated by scanning a product request codes associated with the virtual component. All such product information and product order requests are collected and all product information and product order requests are collected and fulfilled for the entire desired project within the smallest number of shipping containers that can contain all the requested products. However, the present invention is not limited to the 3D modeling program scanning AI method described and other AI methods can be used to practice the invention.

Automatically calculating and determining trends from product information and product order requests includes AI methods for automatically completing a time series analysis. A "time series" is a series of data points indexed (or e.g., listed or graphed, etc.) in time order. Most commonly, a time series is a sequence taken at successive equally spaced points in time. Thus, it is a sequence of discrete-time event data. Time series analysis comprises methods for analyzing time series data in order to extract meaningful statistics and other characteristics of the data. Time series forecasting is the use of a model to predict future values based on previously observed values. However, the present invention is not limited to the time series AI method described and other AI methods can be used to practice the invention.

Automatically calculating and determining trends from product information and product order requests includes AI methods for automatically completing "Multivariate tabular analysis (MVA)." MVA involves observation and analysis of more than one statistical outcome variable at a time using tables of data. In design and analysis, the technique is used to perform studies across multiple dimensions while taking into account the effects of all variables on the responses of interest. However, the present invention is not limited to the MVA AI method described and other AI methods can be used to practice the invention.

Automatically calculating and determining trends from product information and product order requests includes AI methods for automatically determining bounding boxes for shipping containers big enough to include all requested products and at the same time small enough not to waste shipping container resources (e.g., cardboard, tape, padding, etc.)

A "bounding box," is the minimum or smallest bounding or enclosing box for a set of points (S) in N dimensions. A bounding box is a box with the smallest measure (e.g., area, volume, or hypervolume in higher dimensions) within which all the set of points D lie. When other measures are used, the minimum box is usually called accordingly, e.g., a "minimum-perimeter bounding box". The minimum bounding box of a point set S is the same as the minimum bounding box of its convex hull, a fact which may be used heuristically to speed up computation. The term "box" or "hyperrectangle" comes from its usage in the Cartesian coordinate system, where it is visualized as a rectangle (two-dimensional case), rectangular parallelepiped (three-dimensional case), etc.

An Axis-Aligned minimum Bounding Box (or AABB) for a given point set is its minimum bounding box subject to the constraint that the edges of the box are parallel to the (e.g., Cartesian, etc.) coordinate axes. It is simply the Cartesian product of N intervals each of which is defined by the minimal and maximal value of the corresponding coordinate for the points in S. Axis-aligned minimal bounding boxes are used to an approximate locations of objects in question and as a very simple descriptor of its shape. However, the present invention is not limited to the bounding box AI method described and other AI methods can be used to determine an appropriate size and shape of a shipping container required to include all requested products.

In one embodiment, SaaS 64 includes and AI application 30b with the AI methods described herein. In another embodiment, the AI application 30b is a standalone application. However, the present invention is not limited to such an embodiment, and the AI application 30b can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

3D Modeling Programs

In one embodiment the selected type of 3D modeling program 41 includes a Building Information Modeling (BIM) modeling program. In one specific embodiment, the BIM program includes an AUTODESK REVIT, AUTODESK INVENTOR, AUTOCAD, SKETCHUP, VECTORWORKS, MICROSTATION, ARCHICAD, SOLIDWORKS, and/or PROE, etc. modeling program. However, the present invention is not limited to such an embodiment and other 3D modeling programs 41 can be used to practice the invention.

AUTODESK REVIT, is Building Information Modeling (BIM) software for architects, structural engineers, MEP engineers, designers and contractors. It allows users to design a building and structure and its components in 3D, annotate the model with 2D drafting elements and access building information from the building models database. REVIT is 4D BIM capable with tools to plan and track various stages in the building's lifecycle, from concept to construction and later demolition.

AUTODESK INVENTOR, is a 3D mechanical computer aided design (CAD) design software for creating 3D digital prototypes used in the design, visualization and simulation of products.

AUTOCAD is a software application for 2D and 3D CAD and drafting. It has been available since 1982 as a desktop application and since 2010 as a mobile web- and cloud-based application, currently marketed as AUTOCAD 360.

VECTORWORKS is a computer-aided design (CAD) and Building Information Modeling (BIM) software program developed by Nemetschek. VECTORWORKS that is used for drafting, technical drawing and 3D modeling. VECTORWORKS offers 2D, 3D, production management, and presentation capabilities for all phases of the design process.

BENTLEY SYSTEM, INC, is a software company that produces solutions for the design, construction and operation of infrastructure. The company's software serves the building, plant, civil, and geospatial markets in the areas of architecture, engineering, construction (AEC) and operations. Their software solutions are used to design, engineer, build, and operate large constructed assets such as roadways, railways, bridges, buildings, industrial and power plants and utility networks.

BENTLEYS principal software solution is MICROSTATION. MIRCOSTATION is a desktop 2D/3D CAD platform upon which BENTLEY and third-party software companies build more specific solutions. For example, BENTLY MAP is an extension from BENTLEY that runs on top of MICROSTATION adding Graphic Information System (GIS) and spatial capabilities to the CAD program.

The latest versions of MICROSTATION are released solely for MICROSOFT WINDOWS operating systems, but historically MICROSTATION was available for APPLE MACINTOSH platforms and a number of UNIX-like operating systems. MICROSTATION is the platform architectural and engineering software package developed by BENTLEY SYSTEMS, Incorporated. Among a number of things, it generates 2D/3D vector graphic objects and elements.

BENTLEY is also a provider of Building information modeling (BIM) solutions for the Architecture, Structural, Mechanical and Electrical engineering disciplines. BENTLEY also provides GENERATIVE COMPONENTS, a parametric modeling solution used primarily by architects and engineers in building design.

ARCHICAD is an architectural BIM CAD software for APPLE MACINTOSH and Microsoft Windows developed by the Hungarian company GRAPHISOFT. ARCHICAD offers specialized solutions for handling all common aspects of aesthetics and engineering during the whole design process of the built environment—buildings, interiors, urban areas, etc.

Development of ARCHICAD started in 1982 for the original APPLE MACINTOSH. ARCHICAD is recognized as the first CAD product on a personal computer able to create both 2D drawings and parametric 3D geometry.[1] In its debut in 1987 ARCHICAD also became the first implementation of BIM under GRAPHISOFT's "Virtual Building" concept.

SOLIDWORKS is a 3D mechanical CAD program that runs on MICROSOFT WINDOWS and is developed by DASSAULT SYSTÈMES SOLIDWORKS CORP., a subsidiary of DASSAULT SYSTÈMES, S. A. (Vélizy, France).

TC CREO, formerly known as PRO/ENGINEER or PRO/E is a parametric, integrated 3D CAD/CAM/CAE solution created by PARAMETRIC TECHNOLOGY CORPORATION (PTC). It was the first to market with parametric, feature-based, associative solid modeling software. The application runs on MICROSOFT WINDOWS platform, and provides solid modeling, assembly modeling and drafting, finite element analysis, Direct and Parametric modeling, Sub-divisional and nurbs surfacing and NC and tooling functionality for mechanical engineers.

SKETCHUP (Formerly: GOOGLE SKETCHUP) is a 3D modeling program for applications such as architectural, interior design, civil and mechanical engineering, film, and video game design. A freeware version, SKETCHUP MAKE, and a paid version with additional functionality, SKETCHUP PRO, are available.

There is an online Open source repository of free-of-charge model assemblies (e.g., windows, doors, automobiles, etc.), 3D WAREHOUSE, to which users may contribute models. The program includes drawing layout functionality, allows surface rendering in variable "styles", supports third-party "plug-in" programs hosted on a site called Extension Warehouse to provide other capabilities (e.g., near photo-realistic rendering), and enables placement of its models within GOOGLE EARTH.

SKETCHUP can export 3D to Digital Asset Exchange, .DAE and GOOGLE EARTH's Keyhole Markup Language, .KMZ file format. The Pro version extends exporting support to include the AUTOCAD 3D STUDIO DOS, .3DS, AUTOCAD DRAWING, .DWG, AutoCAD DXF (Drawing Interchange Format, or Drawing Exchange Format), .DFX, KAYDARA Filmbox, .FBX, Object geometry definition, .OBJ, AUTODESK Softimage, .XSK, and Virtual Reality Modeling Language .WRL, file formats. GOOGLE SKETCHUP can also save elevations or renderings of the model, called "screenshots", as Bitmap, .BMP, Portable Network Graphics, .PNG, JPEG, .JPG, Tagged Image File Format, .TIF, with the Pro version also supporting Portable Document Format, .PDF, Encapsulated Postscript, .EPS and .EPX, Drawing, .DWG, and AUTOCAD Drawing Exchange format, .DXF.

An AUTODESK REVIT Family File is stored in an RFA format and is affixed with a .RFA extension. These RFA files are generally classified as data files that include one or more 3D models that can be imported into a three dimensional scene and were created and saved using the Revit Family Editor. RFA files contain BIM (Building Information Modeling) data and require Autodesk Revit software. These files are also known as an AUTODESK REVIT file. The AUTODESK REVIT software is used by architects and engineers to design and model. The REVIT model is based on a compilation of items called "families." The compiled items refer to the parametric objects such as 3D building objects and two dimensional drafting objects.

RVT file formatted files with a .RVT extension are data files primarily associated with a Reference View Table. RVT files are also associated with AUTODESK REVIT Design Setup File, INCITE Media Assistant File, IEX Workforce Management Report, APACHE RIVET Tel File and FILEVIEWPRO.

DWG file formatted files (i.e., DraWinG) with a .DWG extension are a binary file format used for storing two and three dimensional design data and metadata. It is the native format for several CAD packages including DRAFTSIGHT, AUTOCAD, INTELLICAD (and its variants) and CADDIE. In addition, DWG is supported non-natively by many other CAD applications. The .BAK (drawing backup), .DWS (drawing standards), .DWT (drawing template) and .SV$ (temporary automatic save) files are also DWG files.

MCD and/or VWX formatted files with a .MCD and/or a .VWX extension are file formats used for storing two and three dimensional design data and metadata for VECTORWORKS.

In addition, using the present invention two or more companies will facilitate work process interoperability between their applications through supporting the reciprocal use of available Application Programming Interfaces (APIs) and the new 3D models created herein including an API for automatically fulfilling architecture, design or construction products.

The present invention has been described for building information modeling (BIM) models and modeling programs. However, the present invention is not limited to BIM models and modeling programs and can be used for other types of modeling and design programs that are used for other types of engineering projects (e.g., airplanes, motors, engines, automobiles, ships, trains, etc.).

In one embodiment, a generic 3D object model template is a template for a specific type of 3D modeling object used by architects, builders, engineers, interior designer, scientists, etc. For examples, the generic 3D object template used by an architect, builder, etc. may be for door, window, beam, truss, flooring, paint, siding, etc. The specific type of 3D object may be a pre-hung door eight feet high, three feet wide, solid core, made of maple wood, stained light brown in color, etc. The generic type of 3D object templates used by engineers may be pipeline components, components of automobiles, trucks, boats, electronic device components, components for multi-layered boards, etc. The generic type of 3D object templates used by interior designers may be furniture, wall hangings, works of art, statutes, etc. However, the present invention is not limited to such embodiments and other blank generic 3D object templates can be used to practice the invention.

In one embodiment, the generic 3D object templates are used to dynamically replace the generic 3D object templates with specific 3D object product templates to select a product information and product order from a specific and desired manufacturer and/or product supplier. This replacement allows architects, builders, engineers, interior designer, scientists, etc. to request products of building, construction and/or design products.

For example, a generic 3D object template for a window may be replaced with a specific 3D object product template for an MARVIN, etc. windows. A generic 3D object template for a wall covering (e.g., paint, etc.) may be replaced with a specific 3D object product template for PPG, etc. paint. The specific 3D object product templates allow the architects, builders, engineers, interior designer, scientists, etc. to directly request actual building, construction and/or design products directly from the 3D modeling program and/or BIM programs.

In one exemplary embodiment, XML mark-up language is used to make product information and product order requests. However, the present invention is not limited to such an embodiment and other mark-up and/or other non-mark-up languages can be used to practice the invention.

An "XML schema" is a description of a type of XML document, typically expressed in terms of constraints on the structure and content of documents of that type, above and beyond the basic syntactical constraints imposed by XML itself. These constraints are generally expressed using some combination of grammatical rules governing the order of elements, Boolean predicates that the content must satisfy, data types governing the content of elements and attributes, and more specialized rules such as uniqueness and referential integrity constraints.

There are languages developed specifically to express XML schemas. The Document Type Definition (DTD) language, which is native to the XML specification, is a schema language that is of relatively limited capability, but that also has other uses in XML aside from the expression of schemas.

In one embodiment, a library application and a Dynamic Link Library (DLL) application is used to make product information and product order requests. However, the present invention is not limited to such an embodiment and other types of library applications can be used to practice the invention.

A Dynamic-link library (DLL), is Microsoft's implementation of the shared library concept in the MICROSOFT WINDOWS and OS/2 operating systems. These libraries usually have the file extension .DLL, .OCX (for libraries containing ActiveX controls), or .DRV (for legacy system drivers). The file formats for DLLs are the same as for WINDOWS EXE files—that is, Portable Executable (PE) for 32-bit and 64-bit Windows, and New Executable (NE) for 16-bit WINDOWS. As with EXEs, DLLs can contain code, data, and resources, in any combination.

Data files with the same file format as a DLL, but with different file extensions and possibly containing only resource sections, can be called resource DLLs. Examples of such DLLs include icon libraries, sometimes having the extension .ICL, and font files, having the extensions .FON and .FOT.

In another embodiment, the library application includes Dynamic Library Loading. This is a mechanism by which a computer program can, at run time, dynamically load a library (or other binary) into memory, retrieve the addresses of functions and variables contained in the library, execute those functions or access those variables, and unload the library from memory. Unlike static linking and load time linking, this mechanism allows a computer program to startup in the absence of these libraries, to discover available libraries, and to potentially gain additional functionality. However, the present invention is not limited to such an embodiment and other types of library applications can be used to practice the invention.

Construction Details in a 3D Modeling Program

"Construction details are companion drawings to plans, sections and elevations and are usually the largest-scale drawings found within sets. They show how building materials and systems interface and include more highly detailed dimensional criteria and material noting." *The Architects Handbook of Professional Practice*—Fifteenth Edition, pg. 681, ISBN: 978-1-118-30882-0, November 2013. This artitects handbook is incorporated herein by reference.

Construction details provide a complete description of a specific part of an object such as a building, bridge, tunnel, engineering system, etc. Construction details are used on large-scale drawings that show comprehensive information about parts that may be described in less detail on general arrangement drawings. Construction details typically include dimensions, tolerances, notation, symbols and specification information about construction objects.

Construction details include 2D orthogonal projections showing plans, sections and elevations and are prepared using Computer Aided Design (CAD) software. 3D modeling programs such as Building information modeling (BIM) programs are also being used to create detailed 3D representations of construction details for buildings and their components.

Suppliers of construction and building materials provide standard construction details for the components they provide. Architects, engineers, designers, contractors, etc. create their own standard construction details that are adopted, used and reused across different projects. Construction details also describe common ways of satisfying buildings regulations and building codes. A series of Accredited Construction Details (ACDs) have been developed to help achieve the performance standards required by building regulations.

It is beneficial to allow an architect, engineer, designer, contractor, etc. to use construction details that have been already created for a desired design project. However, there is no easy way to search, locate, use, reuse and/or updates such construction details from within 3D modeling programs such as BIM modeling programs.

Figure 7:
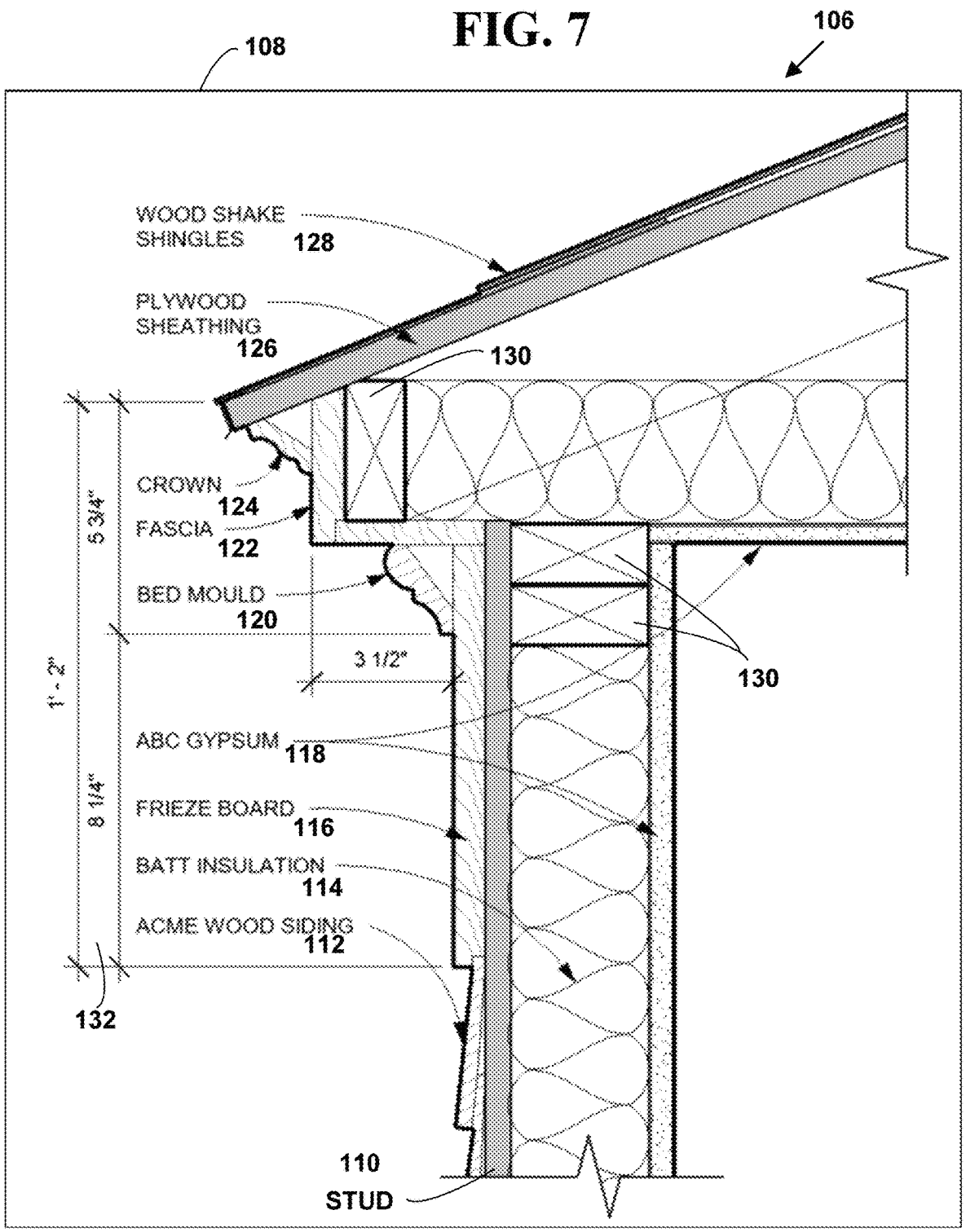
FIG. 7 is a block diagram illustrating an exemplary construction detail for a wall-roof corner.

FIG. 7 is a block diagram 106 illustrating an exemplary construction detail 108 for a corner wall. The exemplary construction detail illustrates a wall stud 110, acme wood siding 112, batt insulation 114, frieze board 116, ABC gypsum 118, bed molding 120, fascia board 122, crown 124, plywood sheathing 126, wood shake shingles 128, gap spaces 130 and measurements 132. However, the present invention is not limited to such an embodiment and this construction detail is exemplary only.

Figure 8:
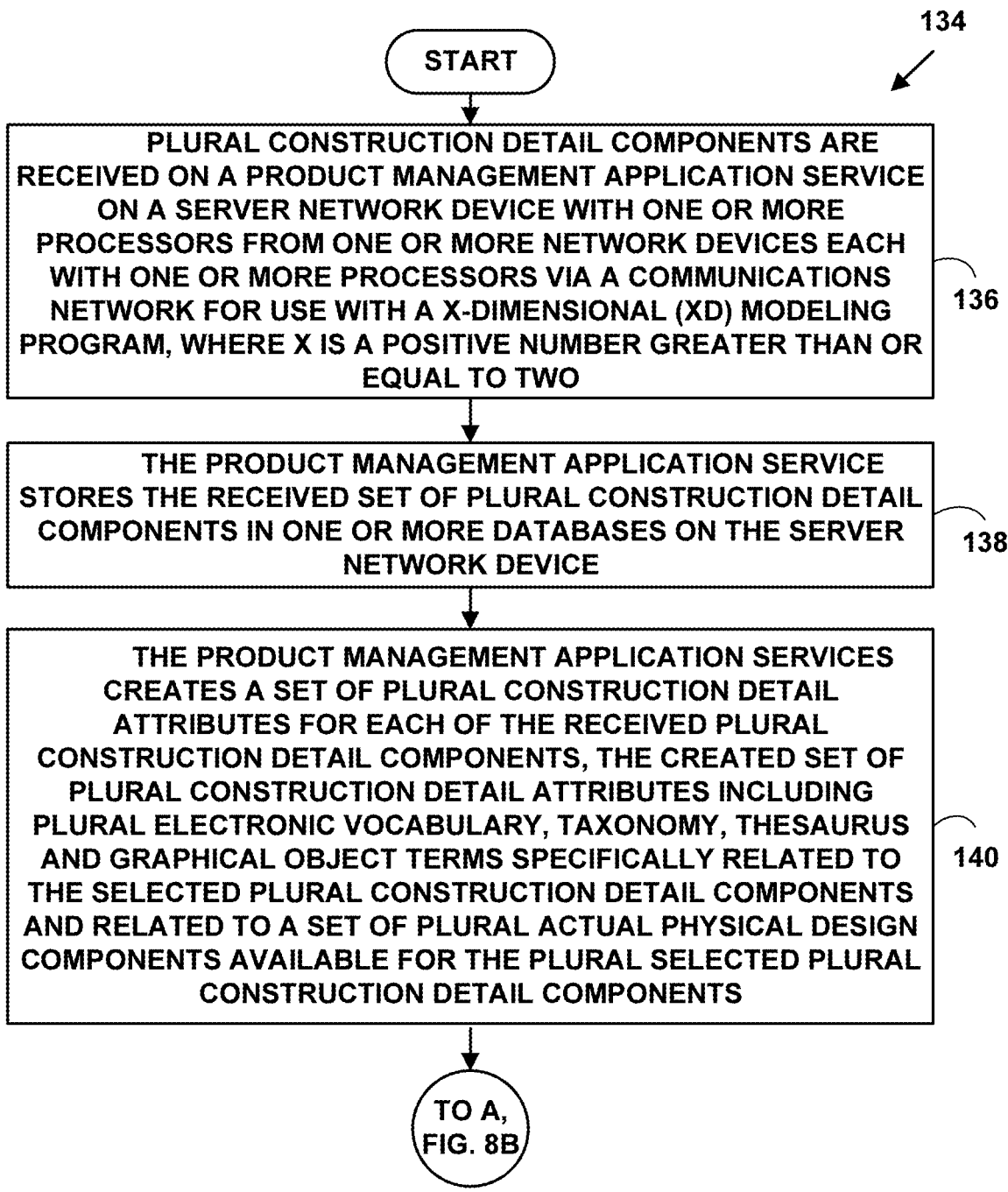
FIGS. 8A, 8B and 8C are flow diagram illustrating a method for automatically creating, indexing, searching and distributing of construction details in modeling program workflows.

FIGS. 8A, 8B and 8C are a flow diagram illustrating a Method 134 for automatically creating, indexing, searching and distributing of construction details in modeling program workflows.

In FIG. 8A at Step 136, plural construction detail components are received on a product management application service on a server network device with one or more processors from one or more network devices each with one or more processors via a communications network for use with a X-dimensional (XD) modeling program, where X is a positive number greater than or equal to two. At Step 138, the product management application service stores the received set of plural construction detail components in one or more databases on the server network device. At Step 140, the product management application services creates a set of plural construction detail attributes for each of the received plural construction detail components, the created set of plural construction detail attributes including plural electronic vocabulary, taxonomy, thesaurus and graphical object terms specifically related to the selected plural construction detail components and related to a set of plural actual physical design components available for the plural selected plural construction detail components. At Step 142, the product management application service creates a first set of electronic indexes with the created set of plural construction detail attributes to quickly, efficiently and effectively locate and access, one or more of the received plural construction detail components. The first of set of electronic indexes including a first set of electronic links to selected ones of the electronic vocabulary, taxonomy, thesaurus and graphical object terms in created set of plural construction detail attributes starting at one or more first general term levels, linking to one or more intermediate term levels and linking to one or more specific term levels, thereby providing a first, one-to-many, general-to-specific, electronic pathway for locating and selecting one or more, first, specific desired construction detail components. In FIG. 8B at Step 144, the product management application service creates a second set of electronic indexes with created set of plural construction detail attributes to quickly, efficiently and effectively access, other ones one or more of the received plural construction detail components, the second of set of electronic indexes including a second set of electronic links to other selected ones of the electronic vocabulary, taxonomy, thesaurus and graphical object terms and graphical object terms in the created set of plural construction detail attributes starting at one or more second specific term levels, linking to one or more intermediate term levels and linking to one or more general term levels, thereby providing a second, many-to-one, specific-to-general, electronic pathway for locating and selecting one or more second, general desired construction detail components. In FIG. 8C at Step 146, the product management application service creates a third set of electronic indexes with created set of plural construction detail attributes to quickly, efficiently and effectively access, electronic product information for plural actual physical products associated with the one or more of the received plural construction detail components, the third of set of electronic indexes including a third set of electronic links to yet other selected ones of the electronic vocabulary, taxonomy, thesaurus and graphical object terms in the created set of plural construction detail attributes starting at a plural different general term levels, intermediate term levels and specific term levels, thereby providing a third, pathway for locating and selecting one or more actual physical products associated with the one or more of the received plural construction detail components. At Step 148, the project management application hosts via the communications network for one or more other network devices each with one or more other processors, the created first, second and third set of electronic indexes thereby providing the first, one-to-many, general-to-specific, electronic pathway and the second, many-to-one, specific-to-general, electronic pathway for locating and selecting one or more construction detail components and the third electronic pathway for locating and selecting one or more actual physical products associated with the one or more of the received plural construction detail components, outside of, or directly within the XD modeling program.

Method 134 is illustrated with an illustrated an exemplary embodiment. However, the present invention is not limited to this exemplary embodiment and other embodiments may be used to practice the invention.

In such an exemplary embodiment in FIG. 8A at Step 136, plural construction detail components 43, 108 are received on a product management application service 30*a* on a server network device 20 with one or more processors from one or more network devices 12, 14, 16, 22, 24, 26, 29, 31, 98-104 each with one or more processors via a communications network 18, 18' for a X-dimensional (XD) modeling program 41, where X is positive number greater than or equal to two. For example, two-dimensional (2D), three-dimensional (3D), etc.

"Construction details are companion drawings to plans, sections and elevations and are usually the largest-scale drawings found within sets. They show how building materials and systems interface and include more highly detailed dimensional criteria and material noting." *The Architects Handbook of Professional Practice*—Fifteenth Edition, pg. 681, ISBN: 978-1-118-30882-0, November 2013, is incorporated herein by reference.

Construction detail drawings also demonstrate compliance with building codes and building regulations and other building requirements, provide information about assembly, edges and junctions between building components and show specific construction information. However, the present invention is not limited to these definitions of construction details and other definitions of construction details can be used to practice the invention.

In one embodiment, the project management application service 30*a* includes a Specific cloud software Services as a Service (SaaS) 64 for a cloud communications network 18' and/or a web-site service for the communications network 18 such as the Internet, a public and/or private intranet, etc. However, the present invention is not limited to such embodiments and other embodiments and other types of services can be used to practice the invention.

In one embodiment, the XD modeling program includes a three-dimensional (3D) modeling program 41 includes a BIM program 41*a*. In one embodiment, the BIM program 41*a* includes an AUTODESK REVIT program, an AUTOCAD program, a VECTORWORKS program, a MICROSTATION program, an ARCHICAD program, and/or a SKETCHUP program. However, the present invention is not limited to these embodiments and/or other embodiments and/or other 3D modeling programs may be used to practice the invention.

In one embodiment, XD modeling program 41 further includes a fourth dimensional (4D) or higher dimensional modeling object for the plural construction detail components 43, 108. However, the present invention is not limited to this embodiment and other embodiments may be used to practice the invention.

A 4D BIM is a term widely used in the CAD industry, refers to the intelligent linking of individual 3D CAD components or assemblies with time or schedule-related information. The use of the term 4D is intended to refer to the fourth dimension: time (i.e., 4D is 3D+schedule (time)).

The construction of the 4D models enables the various participants (e.g., from architects, designers, contractors to owners) of a construction project, to visualize the entire duration of a series of events and display the progress of construction activities through the lifetime of the project.

This BIM-centric approach towards project management technique has a very high potential to improve the project management and delivery of construction project, of any size or complexity.

In one embodiment, XD modeling program 41 further includes fifth dimensional (5D) modeling objects. A 5D BIM is also term widely used in the CAD industry, which refers to the intelligent linking of individual 3D CAD components or assemblies with schedule (time, 4D) constraint and cost-related information (5D). The use of the term 5D is intended to refer to the addition of 4D: time and 5D: cost to the 3D model (i.e., 5D is 3D+schedule (4D time)+cost).

The construction of the 5D models enables the various participants (e.g., from architects, designers, contractors to owners) of any construction project, to visualize the progress of construction activities and its related costs over time.

Returning to FIG. 8A at Step 138, the product management application service 30*a* stores the received set of plural construction detail components 43, 108 on the server network device 20. In one embodiment, the product management application 30*a* stores the received set of plural construction detail components 43, 108 in one or more databases 20' and/or in one or more cloud storage objects 82 in one or more cloud databases 20'. However, the present invention is not limited to these embodiments and other embodiments and other storage systems (e.g., non-transitory computer readable mediums, etc.) may be used to practice the invention.

At Step 140, the product management application service 30*a* creates a set of plural construction detail attributes 45 for each of the received plural construction detail components 43, 108. The created set of plural construction detail attributes 45 including plural electronic vocabulary, taxonomy, thesaurus and graphical object terms specifically related to the selected plural construction detail attributes components 43, 108 and related to a set of plural actual physical design components 47 available for the plural selected plural construction detail components 43, 108.

The "vocabulary terms," include, but are not limited to, terms of art used and other general and specific vocabulary words used in the architecture, design, engineering, and/or construction industries. A "term of art," includes, but is not limited to, words with particular meaning in a specific industry. It implies that a word or phrase is a typical one in a particular industry and people working in the respective industry or business will be familiar with and use the term. However, the present invention is not limited to such an embodiment and other embodiments may be used to practice the invention.

For example the term "lookout" is an architecture term of art with a meaning of "wooden joists that extend beyond the exterior wall in a cantilever-like manner, to a support roof sheathing phase in construction, etc." and a "purlin" is a construction term of art with the meaning of "any longitudinal element implemented on the roof structure horizontally for additional structural or material support," etc. However, the present invention is not limited to such an embodiment and other embodiments may be used to practice the invention.

"Taxonomy terms" and related taxonomy structures include, but are not limited to, terms and structures related to a practice and science of classification of things or concepts, including the principles that underlie such classification. In one embodiment, taxonomies of entities are tree structures whose nodes are labelled with entities likely to occur in a web search query. Search use of these tree structures match keywords from a search query to keywords from answers in electronic information repositories. Taxonomy terms are crucial components for many applications of information retrieval, natural language processing and knowledge management. However, the present invention is not limited to such an embodiment and other embodiments may be used to practice the invention.

A taxonomy structure with taxonomy terms is a useful way to categorize and organize how content site is searched. Taxonomy terms are organized into groups called "vocabularies." For example, a taxonomy vocabulary called "walls" may include the taxonomy terms "interior, exterior, corner, partition, etc." However, the present invention is not limited to such an embodiment and other embodiments may be used to practice the invention.

Thesaurus terms, include, but are not limited to, synonyms (i.e., similar meanings, etc.) and sometimes antonyms (i.e., opposite meanings, etc.) of words. For example, synonyms for the word "wall" may include the thesaurus terms "barrier, partition, room divider, enclosure, screen, panel, etc.").

However, the present invention is not limited to such embodiments and other embodiments may be used to practice the invention.

The graphical object terms, include, but are not limited to, such terms as shading, stippling, hatching, crosshatching, teardrop, wavy, etc. They also include, but are not limited to, names of graphical objects including doors, windows, walls, floor, roofs, etc. and individual graphical objects in the construction details they include, etc.

Shading, is the process of adding value to create an illusion of form, space and light in a drawing.

Stippling, is the creation of a pattern simulating varying degrees of solidity or shading by using small dots.

Hatching, is a technique used to create tonal or shading effects by drawing closely spaced parallel lines. When lines are placed at an angle to one another, it is called crosshatching.

For example, a graphical object named "walls," may include graphical objects named: interior, exterior, studs, plaster, siding, drywall, insulation, trim, etc. Drywall (also known as plasterboard, wallboard, sheetrock, gypsum board, and/or gypsum panels) is commonly illustrated with "stippling" on architectural drawings (item 118, FIG. 7). So an architect may use the graphical search term "stippling" to search for all construction details that include walls including drywall, etc. Batt insulation (item 114, FIG. 7) is often illustrated with "teardrop" shape on architectural drawings. So an architect may use the graphical search term "teardrop" to search for all construction details that include batt insulation. Frieze board (e.g., a type of trim, etc.) is often illustrated with wavy lines (item 116, FIG. 7) on architectural drawings. So an architect may use the graphical search term "wavy" to search for all construction details that include frieze board, etc. However, the present invention is not limited to such graphical object terms and other types of graphical and/or graphical object terms may be used to practice the invention.

In one embodiment, at Step 140, the product management application service 30*a* automatically creates a set of plural product component attributes 45 for each of the plural construction detail components 43, 108 with plural electronic vocabulary, taxonomy, thesaurus and/or graphical object terms from an *Architectural Graphic Standards* book. The *Architectural Graphic Standards* is the written authority for architects, designers, engineers and building contractors. It provides comprehensive guidance on the visual representation of materials, products, systems, and assemblies.

In such an embodiment, the plural electronic vocabulary, taxonomy thesaurus and/or graphical object terms have been automatically obtained from the *Architectural Graphic Standards* book by the product management application service 30*a* to allow any actual physical design component products 47 available for the materials, products, systems, and assemblies included in the *Architectural Graphic Standards* digital book, other standards book and/or architecture, design or construction product catalog or product sheets, to be automatically ordered, purchased and obtained via the product management application service 30*a*. However, the present invention is not limited to such an embodiment, and other embodiments can be used to practice the invention.

In another embodiment, the product management application 30*a* service automatically obtains the plural electronic vocabulary, taxonomy, thesaurus and/or graphical object terms from digital copies of other standards book and/or catalogs and/or product sheets 59*a* to automatically allow any actual physical design component products 47 to be obtained. However, the present invention is not limited to such an embodiment and other embodiments can be used to practice the invention.

Figure 9:
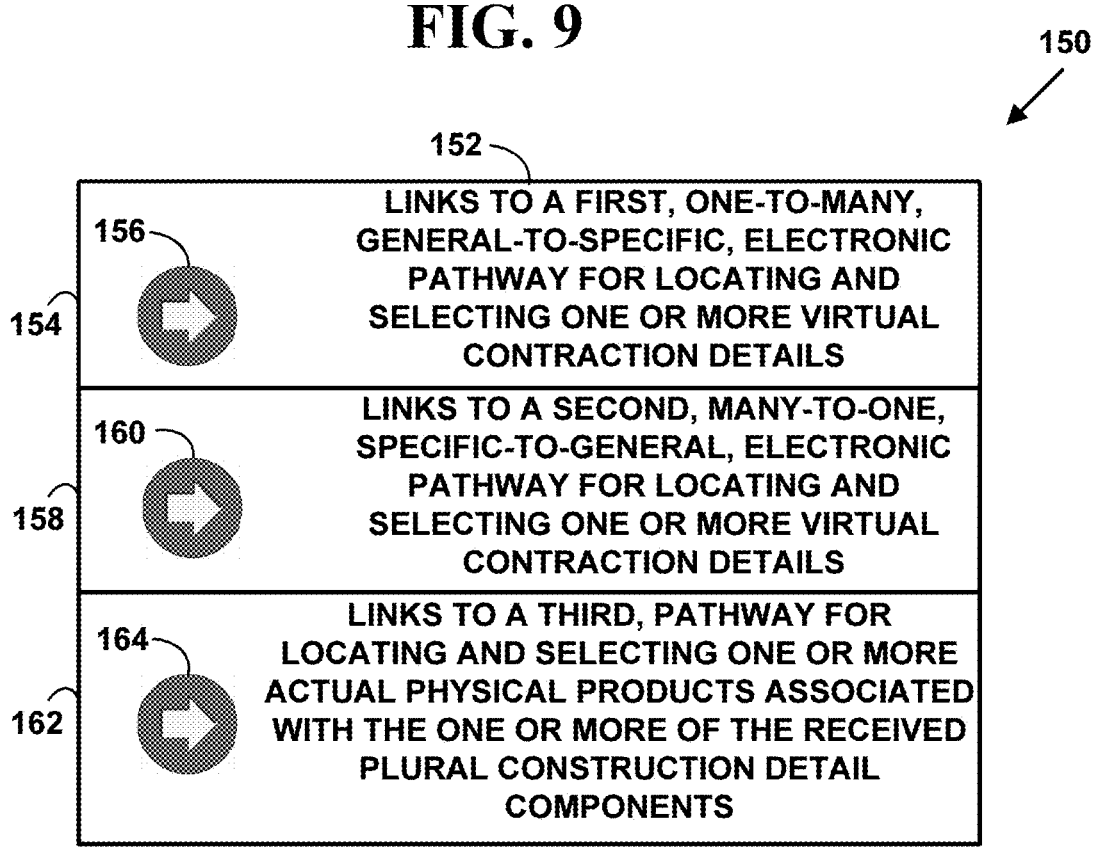
FIG. 9 is a block diagram illustrating an exemplary indexing data structure.

FIG. 9 is a block diagram 150 illustrating an exemplary indexing template data structure 152.

In FIG. 9, the data structure template 152, includes, but is not limited to, a first electronic template component 154 for a first set of electronic links 156, a second electronic template component 158 for a second set of electronic links 160 and a third electronic template component 162 for a third set of electronic links 164. However, the present invention is not limited to such an embodiment and other embodiments may be used to practice the invention.

Returning to FIG. 8A at Step 142, the product management application service 30*a* creates a first set of electronic indexes 154 with the created set of the plural product component attributes 45 to quickly, efficiently and effectively locate and access, one or more of the received plural construction detail components 43, 108. The first of set of electronic indexes 154 including a first set of electronic links 156 to selected ones of the electronic vocabulary, taxonomy, thesaurus and graphical object terms in the created set of plural construction detail attributes 45 starting at one or more first general term levels, linking to one or more intermediate term levels and linking to one or more specific term levels, thereby providing a first, one-to-many, general-to-specific, electronic pathway for locating and selecting one or more, first, specific desired construction detail components 43,108. However, the present invention is not limited to such an embodiment and other embodiments may be used to practice the invention.

In FIG. 8B at Step 144, the product management application service 30*a* creates a second set of electronic indexes 158 with the created set of the plural product component attributes 45 to quickly, efficiently and effectively access, other ones one or more of the received plural construction detail components 43. The second of set of electronic indexes 158 including a second set of electronic links 160 to other selected ones of the electronic vocabulary, taxonomy, thesaurus and graphical object terms in the created set of plural construction detail attributes 45 starting at one or more second specific term levels, linking to one or more intermediate term levels and linking to one or more general term levels, thereby providing a second, many-to-one, specific-to-general, electronic pathway for locating and selecting one or more second, general desired construction detail components 43, 108.

In FIG. 8C at Step 146, the product management application 30*a* service creates a third set of electronic indexes 162 with the created set of the plural product component attributes 45 to quickly, efficiently and effectively access, electronic product information 55, including but not limited to, electronic product sheets 59, 59*a*, for plural actual physical products 47 associated with the one or more of the received plural construction detail components. The third of set of electronic indexes including a third set of electronic links 164 to yet other selected ones of the electronic vocabulary, taxonomy, thesaurus and graphical object terms in the created set of plural construction detail attributes 45 starting at plural different general term levels, plural different intermediate term levels and/or plural different specific term levels, thereby providing a third, pathway for locating and selecting one or more actual physical products associated with the one or more of the received plural construction detail components 43.

At Step 148, the project management application service 30*a* via the communications network for one or more other network devices each with one or more processors, the created first, second and third set of electronic indexes 154, 158, 162, thereby providing the first, one-to-many, general-to-specific, electronic pathway and the second, many-to-one, specific-to-general, electronic pathway for locating and selecting one or more construction detail components 43 and the third electronic pathway for locating and selecting one or more actual physical products 47 associated with the one or more of the received plural construction detail components 43, for use outside of (e.g., via a web service from a web-site, etc.), or directly within the XD modeling program 41 in real-time as a XD drawing is being created.

In one embodiment, Method 134 and the web-service 30*a* and/or SaaS 64 is used to search, locate, collect and download a desired set of construction details outside of the XD modeling program 41. The desired set of construction details is then uploaded back into the XD modeling program at a later time and/or used exclusively outside any XD modeling program. For example, an architect may desire to collect a desired set of construction details to study to determine which may be best to use for upcoming design project, etc.

In one embodiment, and the web-service 30*a* and/or SaaS 64 is used to search, locate, collect and download a desired set of construction details directly within the XD modeling program 41 as a XD drawing is being created within the XD modeling program. The desired set of construction details is used in real-time directly within the XC modeling program 41.

Figure 10:
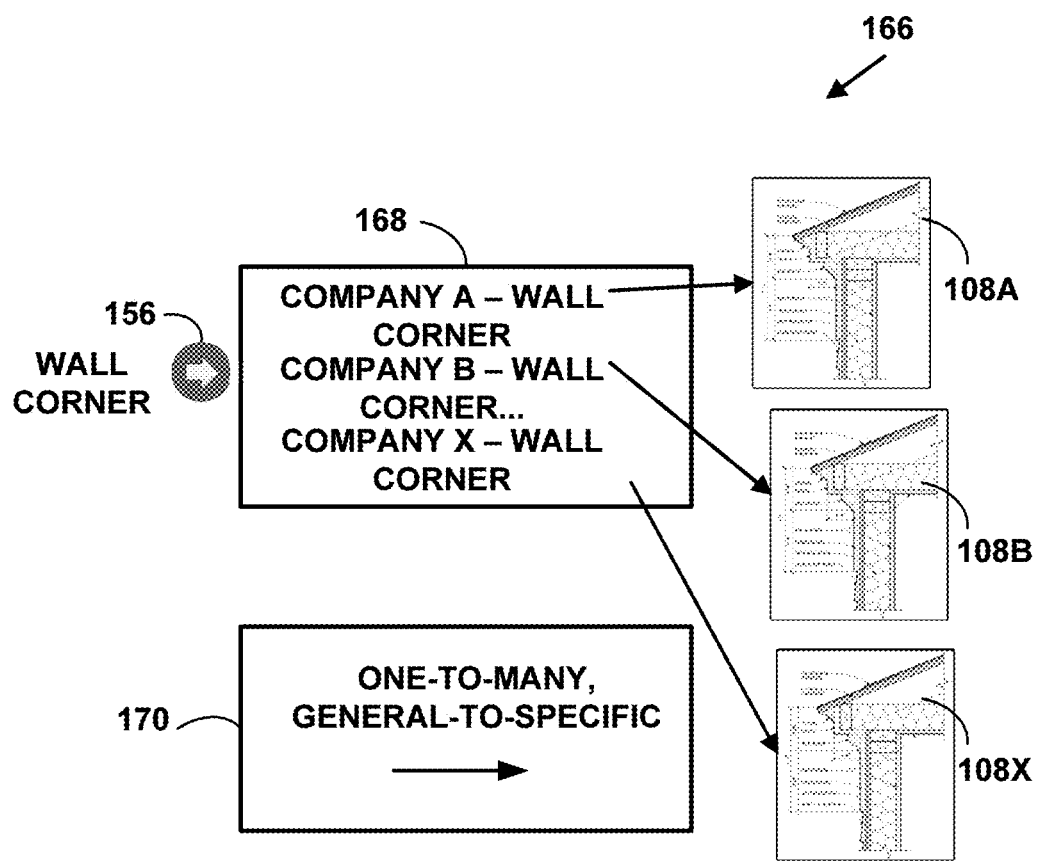
FIG. 10 is a block diagram illustrating an exemplary data flow pathway for construction detail components.

FIG. 10 is a block diagram 166 illustrating an exemplary data flow pathway for construction detail components.

For example, a user desires to determine which companies have provided construction details for wall corners 108 within the XD modeling program 41. FIG. 10 illustrates a first, one-to-many, general-to-specific, electronic pathway 170 using the created first set of electronic links 156 for locating and selecting one or more, first, specific desired construction detail components 108A, 108B, . . . 108X from Companies A, B, . . . X, for a construction detail 43 comprising a wall corner 108, directly within the XD modeling program 41. However, the present invention is not limited to this exemplary embodiment and other embodiments can be used to practice the invention.

Figure 11:
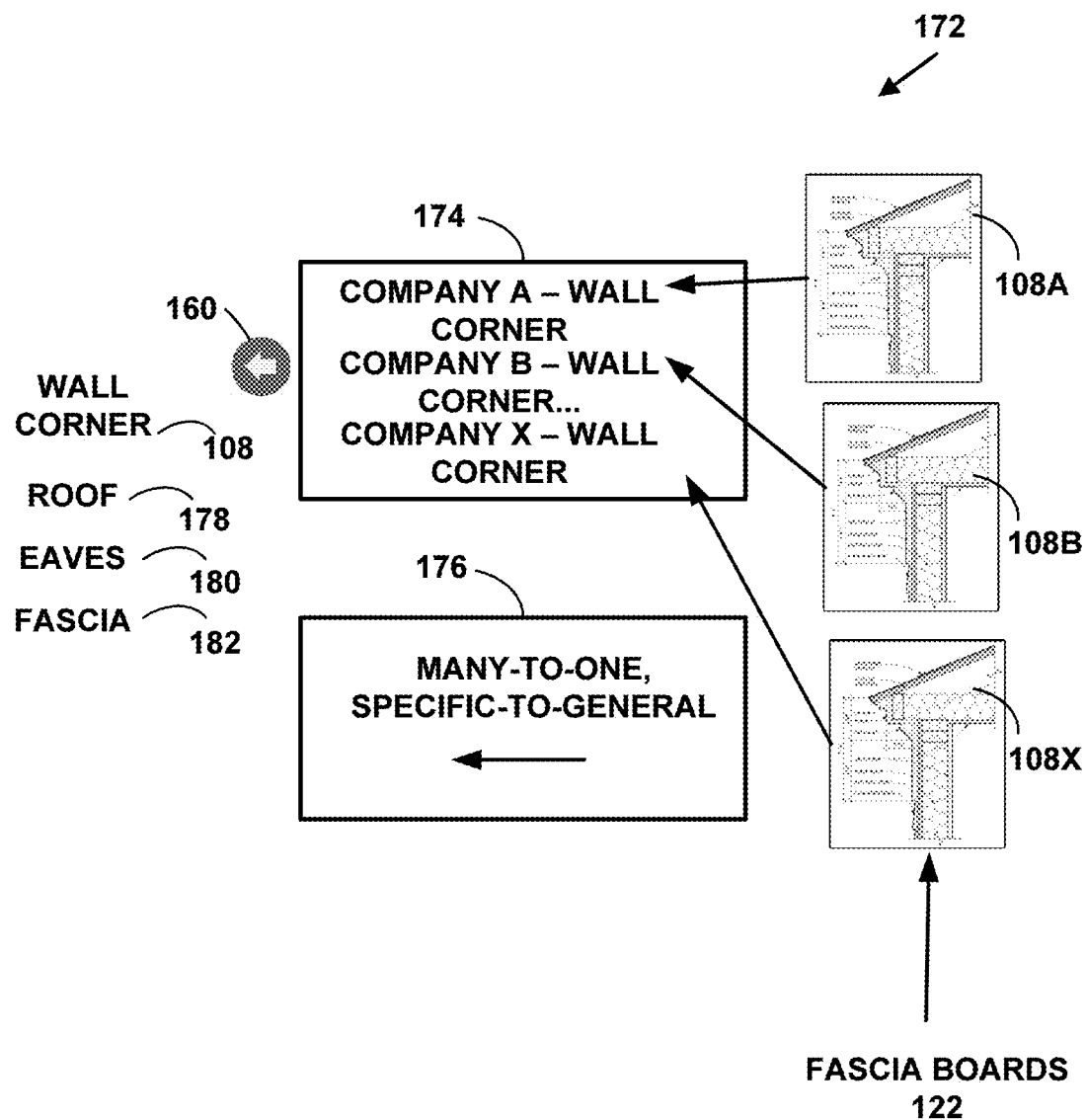
FIG. 11 is a block diagram illustrating an exemplary data flow pathway for construction detail components.

FIG. 11 is a block diagram 172 illustrating an exemplary data flow pathway for construction detail components.

For example, a user desires to determine which construction details include fascia boards 122 within the XD modeling program 41. FIG. 11 illustrates a second, many-to-one, specific-to-general, electronic pathway 176 using the created second set of electronic links 160 for locating and selecting one or more second, general desired construction detail components 43A, 43B, . . . 43X from Companies A, B, . . . X, for a construction detail including a fascia board 122, directly within the 3D modeling program 41. The pathway 176 links back to general construction details for the wall corner 108, a roof 178, an eaves 180 and a fascia 182, etc. that all include a fascia board 122. However, the present invention is not limited to this exemplary embodiment and other embodiments can be used to practice the invention.

In one embodiment, the XD modeling program service 41, 41a includes an Artificial Intelligence (AI) application 30b that automatically manages the received construction details 43 in the 3D modeling program 41, 41a and generates a first message by scanning the received construction details 43 in the XD modeling program 41, 41a for a desired project to determine which of the received construction details 43 representing the actual physical design components 47 are available from the manufacturers or product suppliers for which the actual physical products may be located.

In one embodiment, the communications network 18, 18' further includes one or more AI servers 26 with one or processors to apply pre-processing with the first set AI methods applied to all request messages received from the network device 12, 14, 16, 29, 31, 98-104 requesting the plural different architecture, design or construction, physical product information for the desired project before the request messages are received on the product management application 30a on the server network device 20. However, the present invention is not limited to this embodiment and other embodiments can be used to practice the invention In one embodiment, the AI application 30b on the product management application service 30a automatically generates plural processing messages based on learned preferences or learned requests received from plural different manufacturer web-sites and supplier web-sites and stored in a Big Data set. For example, a first manufacturer always keeps its supply of physical products in stock and up to date at a pre-determined physical location 144. A first supplier requires all of its physical products to be 3D printed and/or fabricated, etc.

In another embodiment, the AI application 30b automatically generates plural processing messages based on learned preferences or learned requests received from plural different architects, designers and engineers and stored in a Big Data set. For example, a first architect may always request a specific same type of hardwood flooring, a second architect may always request a specific same type of siding, etc.

However, the present invention is not limited to these embodiments and other types of AI actions or non-AI actions can be used to practice the invention.

Figure 12:
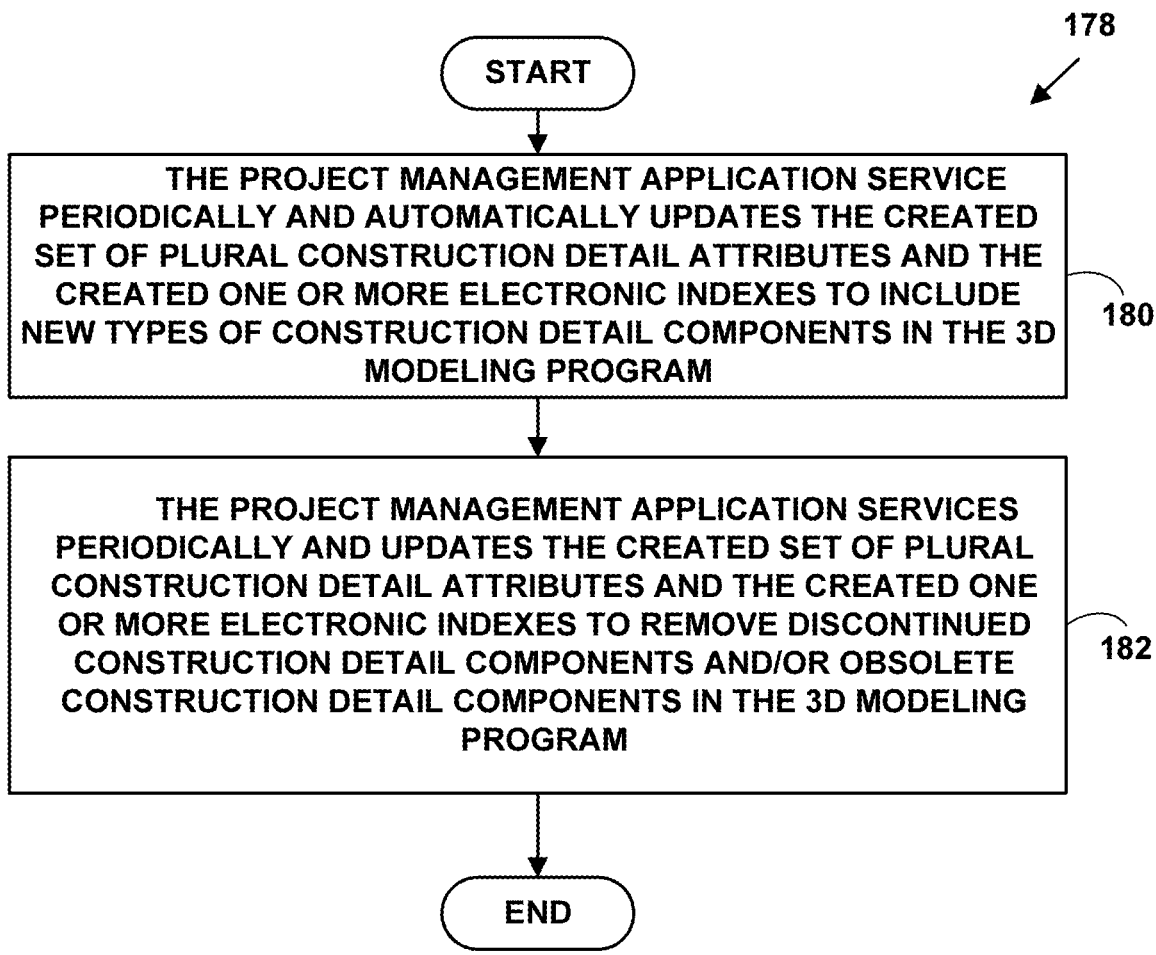
FIG. 12 is a flow diagram illustrating a method for automatically creating, indexing, searching and distributing of construction details in modeling program workflows.

FIG. 12 is a flow diagram illustrating a Method 178 for automatically creating, indexing, searching and distributing of construction details in modeling program workflows.

In FIG. 12 at Step 180, the project management application service periodically and automatically updates the created set of plural construction detail attributes and the created one or more electronic indexes to include new types of construction detail components in the XD modeling program. At Step 182, the project management application periodically and updates in the created set of plural construction detail attributes and the created one or more electronic indexes to remove discontinued construction detail components and/or obsolete construction components in the XD modeling program.

Method 178 is illustrated with an illustrated an exemplary embodiment. However, the present invention is not limited to this exemplary embodiment and other embodiments may be used to practice the invention.

In such an exemplary embodiment in FIG. 12 at Step 180, the project management application service 30a periodically and automatically updates the created set of plural construction detail attributes 45 and the one or more electronic indexes 49 to include new types of construction detail components 43 in the XD modeling program 41, 41a.

At Step 182, the project management application 30a the project management application service 30a automatically and periodically updates in the created set of plural construction detail attributes 45 and the created one or more electronic indexes 49 to remove discontinued construction detail components 43 or obsolete construction components 43 in the 3D modeling program 41, 41a.

Figure 13:
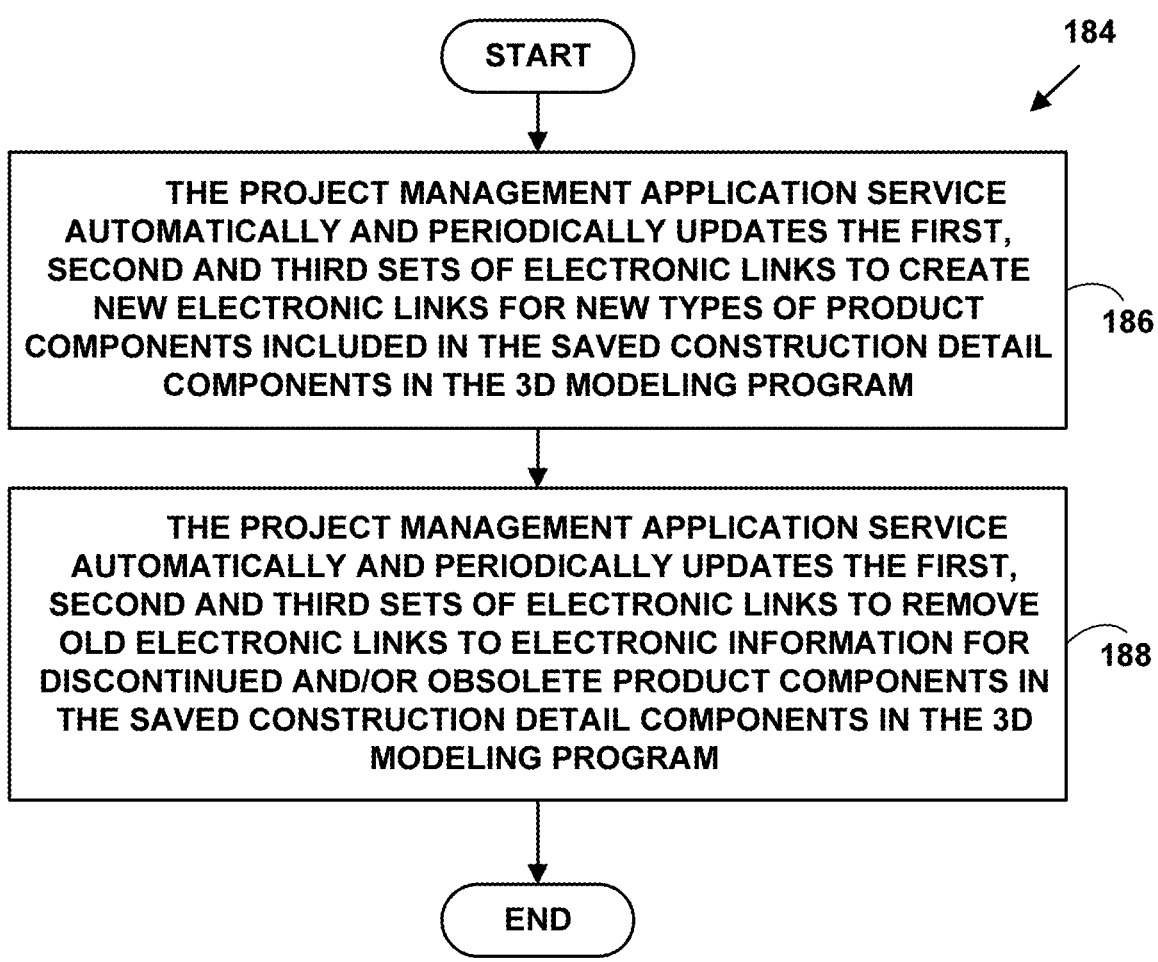
FIG. 13 is a flow diagram illustrating a method for automatically creating, indexing, searching and distributing of construction details in modeling program workflows.

FIG. 13 is a flow diagram illustrating a Method 184 for automatically creating, indexing, searching and distributing of construction details in modeling program workflows.

In FIG. 13 at Step 186, the project management application automatically and periodically updates the first, second and third sets of electronic links to create new electronic links for new types of product components included in construction detail components in the 3D modeling program. At Step 188, the project management application automatically and periodically updates the first, second and third sets of electronic links to remove old electronic links to electronic information for discontinued and/or obsolete product components in the construction details in the 3D modeling program.

Method 184 is illustrated with an illustrated an exemplary embodiment. However, the present invention is not limited to this exemplary embodiment and other embodiments may be used to practice the invention.

In such an exemplary embodiment in FIG. 13 at Step 186, the project management application 30a automatically and periodically updates the first, second and third sets of electronic links 156, 160, 164 to create new electronic links 156', 160' 164' for new types of product components included in new construction detail components 43 in the XD modeling program 41, 41a.

At Step 188, the project management application 30a automatically and periodically updates the first, second and third sets of electronic links 156, 160, 164 to remove old electronic links to electronic information for discontinued and/or obsolete product components in the construction details 43 in the XD modeling program 41, 41a.

Figure 14:
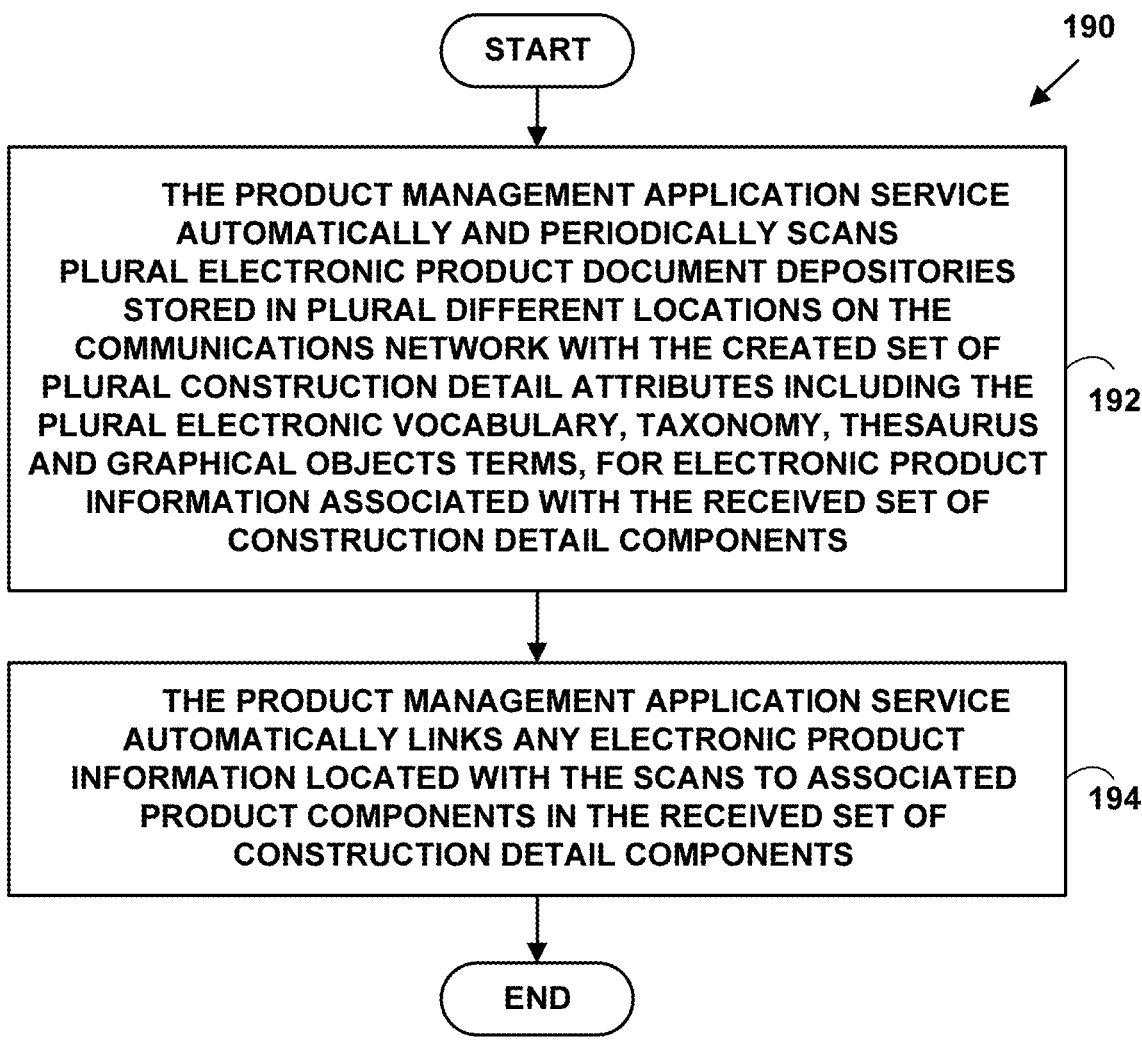
FIG. 14 is flow diagram illustrating a method for automatically creating, indexing, searching and distributing of construction details in modeling program workflows.

FIG. 14 is a flow diagram illustrating a Method 188 for automatically creating, indexing, searching and distributing of construction details in modeling program workflows.

In FIG. 14, at Step 190, the product management application service automatically and periodically scans plural electronic product document depositories stored in plural different locations on the communications network with the created set of plural construction detail attributes including the plural electronic vocabulary, taxonomy, thesaurus and graphical object terms, for electronic product information associated with the received set of construction detail components. At Step 192, product management application service automatically links any electronic product information located with the scans to associated product components in the received set of construction detail components.

Method 184 is illustrated with an illustrated an exemplary embodiment. However, the present invention is not limited to this exemplary embodiment and other embodiments may be used to practice the invention.

In such an exemplary embodiment in FIG. 14, at Step 190 the product management application service 30a automatically and periodically scans plural electronic product document depositories 22, 24, 26, stored in plural different locations on the communications network 18, 18' with the created set of plural construction detail attributes 45 including the plural electronic vocabulary, taxonomy, thesaurus and graphical object terms, for electronic product information associated with the received set of construction detail components 43.

At Step 192, product management application service 30a automatically links any electronic product information located with the scans to associated product components in the received set of construction detail components 43.

Figure 15:
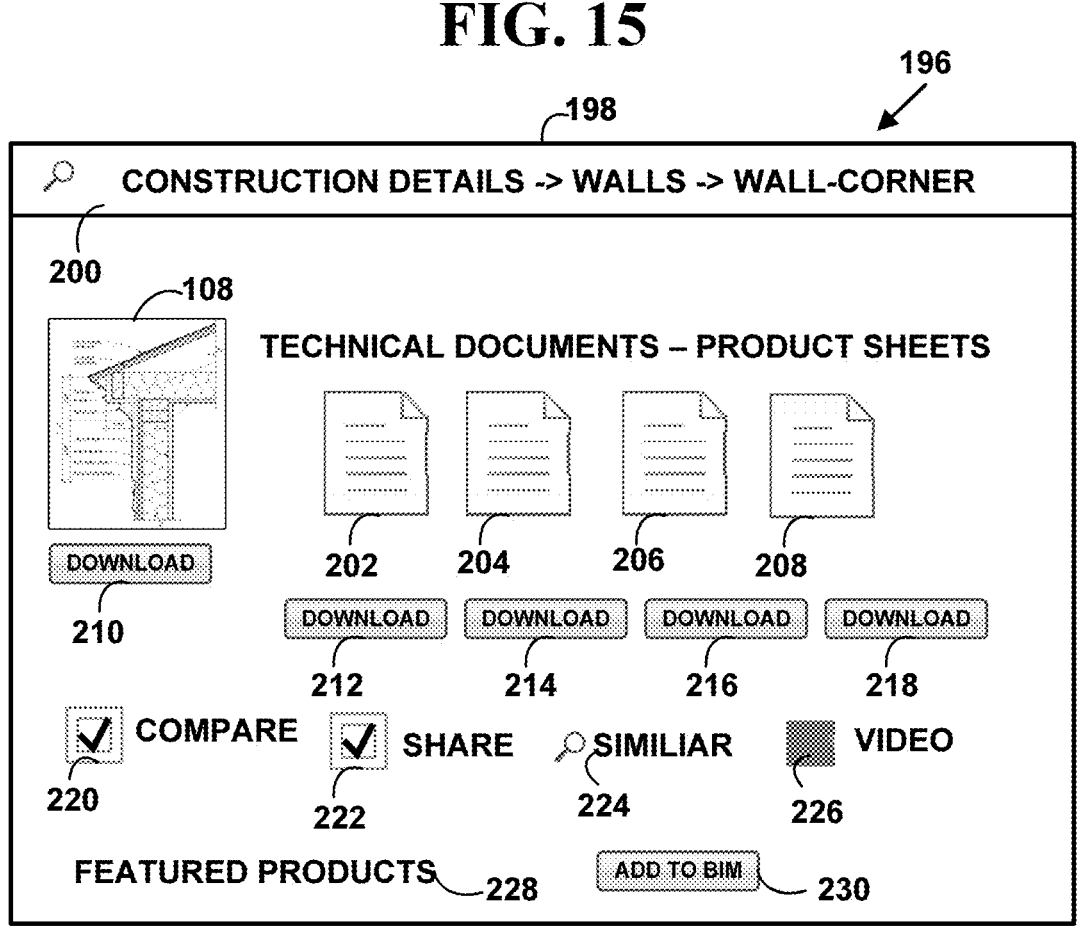
FIG. 15 is a block diagram illustrating an exemplary graphical user interface for searching and using construction details in a modeling program workflow.

FIG. 15 is a block diagram 196 illustrating an exemplary graphical user interface (GUI) 198 for searching and using construction details in a modeling program workflow.

The GUI 198 includes a search component 200 to search for a selected construction detail component 108 (e.g., wall-corner, etc.) plural technical documents 202-208 (only 4 of which are illustrated for simplicity) including, but not limited to, other construction details including other construction detail components 43 for components included (e.g., stud 110, fascia board 122, etc.) in the selected construction detail component 108, and/or product sheets for physical components associated with the other construction detail components 43, plural graphical buttons 210-218 (only 5 of which are illustrated for simplicity) to download selected construction detail component 108 and/or plural technical documents 202-208, a compare component 220, to compare the selected construction detail component 108 to other saved construction detail components, a share component 222 to share the selected construction detail component 108 to other network devices 12, 14, 16, 22, 24, 26, 29, 31, 98-104, a similar construction detail component 224 for searching for similar, related construction details, a video component 226 for providing additional video information about the a selected construction detail component 108 one or more featured products 228, for listing product offerings for suppliers of building and construction products, including but not limited to, selling advertising in this space for such featured products, and/or an "Add to BIM" component 230 for adding the selected construction detail component 108 and/or any of the plural technical documents 202-208 directly to the XD modeling program 41, 41a. However the present invention is not limited to this embodiment and other embodiments with, more, fewer and/or other graphical components can be used to practice the invention.

In one embodiment, the project management application 30a provides the GUI 198 to the one or more network devices 12, 14, 16, 22, 24, 26, 29, 31, 98-104, outside the 3D modeling program 41, 41a as a standalone GUI 198 via the communications network 18, 18'. In another embodiment, the project management application 30a provides the GUI 198 to the one or more network devices 12, 14, 16, 22, 24, 26, 29, 31, 98-104 within the XD modeling program 41, 41a via the communications network 18, 18'. However the present invention is not limited to this embodiment and other embodiments can be used to practice the invention.

A method and system for automatically hosting, indexing, searching and distributing of construction details in modeling program workflows is presented herein. Product component attributes, one or more indexes and plural different kinds of links are created to allow construction details to be organized, located and searched. The component attributes, one or more indexes and plural different kinds links allow a first, electronic one-to-many, general-to-specific, choice pathway and a second electronic many-to-one, specific-to-general, choice pathway to locate, view, download and distribute construction details directly from a web-site or within a three-dimensional (3D) or other dimensional modeling program. The one or more indexes and plural different kinds of links also include links from the components in a construction detail to actual physical product information such as product sheets.

It should be understood that the architecture, programs, processes, methods and It should be understood that the architecture, programs, processes, methods and systems described herein are not related or limited to any particular type of computer or network system (hardware or software), unless indicated otherwise. Various types of specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A method for creating, indexing, searching and distributing of construction details in modeling program workflows, comprising:
   receiving a plurality of construction detail components on a product management application service on a server network device with one or more processors, from one or more network devices each with one or more processors, via a communications network for use with a X-dimensional (XD) modeling program, wherein X is a positive number greater than two,
   the received plurality of construction detail components comprising:
   (1) a first type of construction detail component provided by an architect, engineer, designer or contractor including:
   providing construction detail components that are created, adopted, used and reused across different design projects by architects, engineers, designers or contractors,
   providing detailed virtual construction detail companion drawings for the design projects,
   providing complete descriptions of specific parts of construction objects in a building,
   providing dimensions, tolerances,
   notation, symbols and specification information about the construction objects in the building,
   providing information about assembly, edges and junctions between building components and showing specific construction information, illustrating how building materials and building systems interface in the construction objects in the building, describing ways of satisfying buildings regulations and building codes the for construction objects in the building, and (2) a second type of construction detail component provided by suppliers of construction and building materials including representing actual physical design components available from manufacturers or product suppliers of the suppliers of the construction and building materials;

scanning on the project management application service, a plurality of electronic product document depositories stored in a plurality of different locations on the communications network including a plurality of electronic vocabulary, taxonomy and thesaurus terms, for electronic product information associated with the received set of construction detail components;

creating with the product management application service, a set of a plurality of construction detail attributes for each of the received plurality of construction detail components, the created set of the plurality of construction detail attributes including a plurality of electronic vocabulary, taxonomy, thesaurus and graphical object terms specifically related to components of the created set of the plurality of construction detail attributes and related to a set of a plurality of actual physical design components available for the received plurality of plurality of construction detail components, the taxonomy terms including tree structures whose nodes are labelled with entities likely to occur in a web search query;

creating with the product management application service, a first set of electronic indexes with the created set of the plurality of construction detail attributes to quickly, efficiently and effectively locate and access, one or more of the received plurality of construction detail components, the first of set of electronic indexes including a first set of electronic links to selected ones of the electronic vocabulary, taxonomy, thesaurus and graphical object terms in the created set of the plurality of construction detail attributes starting at one or more first general terms, linking to one or more intermediate terms and linking to one or more specific terms, thereby providing a first, one-to-many, general-to-specific, electronic pathway for locating and selecting one or more, first, specific desired virtual construction detail components;

creating with the product management application service a second set of electronic indexes with the created set of the plurality of construction detail attributes to quickly, efficiently and effectively access, other ones of the one or more of the received plurality of construction detail components, the second of set of electronic indexes including a second set of electronic links to other selected ones of the electronic vocabulary, taxonomy, thesaurus and graphical object terms in the created set of the plurality of construction detail attributes starting at one or more second specific terms, linking to one or more second intermediate terms and linking to one or more second general terms, thereby providing a second, many-to-one, specific-to-general, electronic pathway for locating and selecting one or more second, general desired virtual construction detail components;

creating with the product management application service a third set of electronic indexes with the created set of the plurality of component attributes to quickly, efficiently and effectively access, electronic product information for a plurality of actual physical products associated with the one or more of the received plurality of construction detail components, the third of set of electronic indexes including a third set of electronic links to yet other selected ones of the electronic vocabulary, taxonomy and thesaurus terms in the created set of the plurality of construction detail attributes starting at a plurality of different general terms, different intermediate terms and different specific terms levels, thereby providing a third, pathway for locating and selecting one or more actual physical products associated with the one or more of the received plurality of construction detail components;

hosting from the project management application service via the communications network for one or more other network devices each with one or more other processors, the created first, second and third set of electronic indexes;

providing from the project management application service via the communications network to the one or more other network devices, the first, one-to-many, general-to-specific, electronic pathway and the second, many-to-one, specific-to-general, electronic pathway, for locating and selecting one or more virtual construction detail components from the one or more other network devices via the communications network; and providing from the project management application service via the communications network to the one or more other network devices, the third electronic pathway, for locating and selecting from the one or more other network devices via the communications network, one or more actual physical products associated with the one or more of the received plurality of construction detail components, from outside of the XD modeling program via a web-service or website via the communications network, or from directly within the XD modeling program.

2. The method of claim 1 wherein the XD modeling program includes a Building Information Modeling (BIM) program.

3. The method of claim 1 where the first type of construction detail component includes two-dimension (2D) orthogonal projections showing plans, sections and elevations and detailed three-dimensional (3D) representations of construction details for buildings and their components.

4. The method of claim 1 further comprising:

updating periodically and automatically on the project management application service the created set of plural construction detail attributes and the created one or more electronic indexes to include new types of construction detail components in the XD modeling program; and updating periodically and automatically on the project management application service the created set of plural construction detail attributes and the created one or more electronic indexes to remove discontinued construction detail components or obsolete construction detail components in the XD modeling program.

5. The method of claim 1 further comprising:
updating periodically and automatically on the project management application service the first, second and third sets of electronic links to create new electronic links for new types of product components included in the saved construction detail components in the XD modeling program; and
updating periodically and automatically on the project management application service the first, second and third sets of electronic links to remove discontinued construction detail components or obsolete construction detail components in the XD modeling program.

6. The method of claim 5 wherein the new types of product components are automatically obtained with the project management application service via the communications network from a plurality of product pages for actual physical architecture, design or construction design product supplier web-sites or manufacturer web-sites.

7. The method of claim 1 wherein the step of creating automatically on the project management application service a set of a plurality of construction detail attributes further comprises:
creating automatically on the project management application service the set of the plurality of construction detail attributes directly from digital copy of an *Architectural Graphic Standards* reference manual.

8. The method of claim 1 further comprising:
linking periodically and automatically on the project management application service any electronic product information located with the scanning on the project management application service the plurality of electronic product document depositories, to associated product components in the received set of construction detail components.

9. The method of claim 1 wherein the project management application service includes an Artificial Intelligence (AI) application that automatically generates the set of the plurality of construction detail attributes, the one or more electronic indexes and the first, second and set of electronic links.

10. The method of claim 9 further comprising:
storing automatically from the AI application on the project management application service the created set of the plurality of construction detail attributes, the one or more electronic indexes and the first, second and third set of electronic links in a Big Data set; and
storing automatically from the AI application on the project management application service based on learned preferences or learned requests received from plurality of different architects, designers and engineers using the XD modeling program and stored in a Big Data set.

11. The method of claim 1 wherein the communications network further includes one or more Artificial Intelligence (AI) servers with one or processors to apply pre-processing with one or more AI methods to process all request messages received from a network device with one or more processors requesting product information or product orders of a plurality of different actual physical design component products for a desired project before the request messages are received on the project management application service on the server network device.

12. The method of claim 1 wherein the communications network includes a cloud communications network comprising: one or more public communications networks, one or more private communications networks, one or more community network or one or more hybrid networks and the cloud communications network includes a cloud computing Infrastructure as a Service (IaaS), a cloud Platform as a Service (PaaS) and Specific cloud Software services as a Service (Saas) including SaaS cloud software services for automatically processing indexing and searching of construction details in an XD modeling program workflow.

13. The method of claim 1 wherein the project management application service includes a specific, cloud Software as a Service (Saas) for a cloud communications network or a web-service for a communications network.

14. The method of claim 1 wherein the one or more network devices include a desktop computer, laptop computer, tablet computer, mobile phone, personal digital/data assistant (PDA), wearable network device, or a smart speaker.

15. The method of claim 1 wherein the server network device and the one or more network devices include one or more wireless communications interfaces comprising: cellular telephone, 802.11a, 802.11b, 802.11g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), aviation communications, Near Field Communications (NFC), Machine-to-Machine (M2M), Bluetooth or infra data association (IrDA) wireless communication interfaces for communicating via the communications network.

16. The method of claim 1 wherein the XD modeling program includes one or more of: two-dimensional (2D), three-dimensional (3D), fourth-dimensional (4D) and fifth-dimensional (5D) object models for a plurality of virtual design components.

17. The method of claim 1 wherein Artificial Intelligence provides a graphical user interface (GUI) including:
a plurality of components comprising: (1) a selected construction detail component, (2) a search component to search for a selected construction detail component, (3) a plurality of technical document components including, other construction details included in the selected construction detail component and product sheets for physical components associated with the other construction detail components and plural graphical buttons to download the selected construction detail component and plural technical documents, (4) a compare component, to compare the selected construction detail component to other saved construction detail components, (5) a share component to share the selected construction detail component to the one or more other network devices, (6) a similar construction detail component for searching for similar, related construction details, (7) a video component for providing additional video information about the a selected construction detail component, (8) one or more featured products, for listing product offerings for suppliers of building and construction products and (9) an Add to Building Information Modeling (BIM) component, for adding the selected construction detail component and any of the plural technical documents directly into a BIM modeling program.

18. The method of claim 1 wherein the project management application service provides a graphical user interface (GUI) for accessing, searching, downloading and using the saved construction detail components directly within the XD modeling program.

19. The method of claim 1 wherein the project management application service provides a graphical user interface (GUI) outside the XD modeling program to the other one or more network devices via the communications network for accessing, searching, downloading and using the saved construction detail components for a desired building project outside of the XD modeling program.

20. A non-transitory computer readable medium having stored therein a plurality of instructions configured for causing one more processors on one more network devices connected to execute the steps of:
receiving a plurality of construction detail components on a product management application service on a server network device with one or more processors, from one or more network devices each with one or more processors, via a communications network for use with a X-dimensional (XD) modeling program, wherein X is a positive number greater than two,
the received plurality of construction detail components comprising:
(1) a first type of construction detail component provided by an architect, engineer, designer or contractor including:
providing construction detail components that are created, adopted, used and reused across different design projects by architects, engineers, designers or contractors,
providing detailed virtual construction detail companion drawings for the design projects,
providing complete descriptions of specific parts of construction objects in a building,
providing dimensions, tolerances,
notation, symbols and specification information about the construction objects in the building,
providing information about assembly, edges and junctions between building components and showing specific construction information,
illustrating how building materials and building systems interface in the construction objects in the building,
describing ways of satisfying buildings regulations and building codes the for construction objects in the building, and
(2) a second type of construction detail component provided by suppliers of construction and building materials including representing actual physical design components available from manufacturers or product suppliers of the suppliers of the construction and building materials;
scanning on the project management application service, a plurality of electronic product document depositories stored in a plurality of different locations on the communications network including a plurality of electronic vocabulary, taxonomy and thesaurus terms, for electronic product information associated with the received set of construction detail components;
creating with the product management application service, a set of a plurality of construction detail attributes for each of the received plurality of construction detail components,
the created set of the plurality of construction detail attributes including a plurality of electronic vocabulary, taxonomy, thesaurus and graphical object terms specifically related to components of the created set of the plurality of construction detail attributes and related to a set of a plurality of actual physical design components available for the received plurality of plurality of construction detail components,
the taxonomy terms including tree structures whose nodes are labelled with entities likely to occur in a web search query;
creating with the product management application service, a first set of electronic indexes with the created set of the plurality of construction detail attributes to quickly, efficiently and effectively locate and access, one or more of the received plurality of construction detail components,
the first of set of electronic indexes including a first set of electronic links to selected ones of the electronic vocabulary, taxonomy, thesaurus and graphical object terms in the created set of the plurality of construction detail attributes starting at one or more first general terms, linking to one or more intermediate terms and linking to one or more specific terms,
thereby providing a first, one-to-many, general-to-specific, electronic pathway for locating and selecting one or more, first, specific desired virtual construction detail components;
creating with the product management application service a second set of electronic indexes with the created set of the plurality of construction detail attributes to quickly, efficiently and effectively access, other ones of the one or more of the received plurality of construction detail components,
the second of set of electronic indexes including a second set of electronic links to other selected ones of the electronic vocabulary, taxonomy, thesaurus and graphical object terms in the created set of the plurality of construction detail attributes starting at one or more second specific terms, linking to one or more second intermediate terms and linking to one or more second general terms,
thereby providing a second, many-to-one, specific-to-general, electronic pathway for locating and selecting one or more second, general desired virtual construction detail components;
creating with the product management application service a third set of electronic indexes with the created set of the plurality of component attributes to quickly, efficiently and effectively access, electronic product information for a plurality of actual physical products associated with the one or more of the received plurality of construction detail components,
the third of set of electronic indexes including a third set of electronic links to yet other selected ones of the electronic vocabulary, taxonomy and thesaurus terms in the created set of the plurality of construction detail attributes starting at a plurality of different general terms, different intermediate terms and different specific terms levels,
thereby providing a third, pathway for locating and selecting one or more actual physical products associated with the one or more of the received plurality of construction detail components;
hosting from the project management application service via the communications network for one or more other network devices each with one or more other processors, the created first, second and third set of electronic indexes;

providing from the project management application service via the communications network to the one or more other network devices, the first, one-to-many, general-to-specific, electronic pathway and the second, many-to-one, specific-to-general, electronic pathway, for locating and selecting one or more virtual construction detail components from the one or more other network devices via the communications network; and providing from the project management application service via the communications network to the one or more other network devices, the third electronic pathway, for locating and selecting from the one or more other network devices via the communications network, one or more actual physical products associated with the one or more of the received plurality of construction detail components, from outside of the XD modeling program via a web-service or website via the communications network, or from directly within the XD modeling program.

21. A system for creating, indexing, searching and distributing of construction details in modeling program workflows, comprising in combination:

a communications network;

one or more server network devices each with one or more processors and a non-transitory computer readable medium;

one or more network devices each with one or more processors and a non-transitory computer readable medium;

the one or more server network devices and the one or more network devices including a plurality of instructions:

for receiving a plurality of construction detail components on a product management application service on a server network device with one or more processors, from one or more network devices each with one or more processors, via a communications network for use with a X-dimensional (XD) modeling program, wherein X is a positive number greater than two, the received plurality of construction detail components comprising:

(1) a first type of construction detail component provided by an architect, engineer, designer or contractor including:

providing construction detail components that are created, adopted, used and reused across different design projects by architects, engineers, designers or contractors, providing detailed virtual construction detail companion drawings for the design projects, providing complete descriptions of specific parts of construction objects in a building, providing dimensions, tolerances, notation, symbols and specification information about the construction objects in the building, providing information about assembly, edges and junctions between building components and showing specific construction information, illustrating how building materials and building systems interface in the construction objects in the building, describing ways of satisfying buildings regulations and building codes the for construction objects in the building, and (2) a second type of construction detail component provided by suppliers of construction and building materials including representing actual physical design components available from manufacturers or product suppliers of the suppliers of the construction and building materials;

for canning on the project management application service, a plurality of electronic product document depositories stored in a plurality of different locations on the communications network including a plurality of electronic vocabulary, taxonomy and thesaurus terms, for electronic product information associated with the received set of construction detail components;

for creating with the product management application service, a set of a plurality of construction detail attributes for each of the received plurality of construction detail components, the created set of the plurality of construction detail attributes including a plurality of electronic vocabulary, taxonomy, thesaurus and graphical object terms specifically related to components of the created set of the plurality of construction detail attributes and related to a set of a plurality of actual physical design components available for the received plurality of plurality of construction detail components, the taxonomy terms including tree structures whose nodes are labelled with entities likely to occur in a web search query;

for creating with the product management application service, a first set of electronic indexes with the created set of the plurality of construction detail attributes to quickly, efficiently and effectively locate and access, one or more of the received plurality of construction detail components, the first of set of electronic indexes including a first set of electronic links to selected ones of the electronic vocabulary, taxonomy, thesaurus and graphical object terms in the created set of the plurality of construction detail attributes starting at one or more first general terms, linking to one or more intermediate terms and linking to one or more specific terms, thereby providing a first, one-to-many, general-to-specific, electronic pathway for locating and selecting one or more, first, specific desired virtual construction detail components;

for creating with the product management application service a second set of electronic indexes with the created set of the plurality of construction detail attributes to quickly, efficiently and effectively access, other ones of the one or more of the received plurality of construction detail components, the second of set of electronic indexes including a second set of electronic links to other selected ones of the electronic vocabulary, taxonomy, thesaurus and graphical object terms in the created set of the plurality of construction detail attributes starting at one or more second specific terms, linking to one or more second intermediate terms and linking to one or more second general terms, thereby providing a second, many-to-one, specific-to-general, electronic pathway for locating and selecting one or more second, general desired virtual construction detail components;

for creating with the product management application service a third set of electronic indexes with the created set of the plurality of component attributes to quickly, efficiently and effectively access, electronic product information for a plurality of actual physical products associated with the one or more of the received plurality of construction detail components, the third of set of electronic indexes including a third set of electronic links to yet other selected ones of the electronic vocabulary, taxonomy and thesaurus terms in the created set of the plurality of construction detail attributes starting at a plurality of different general terms, different intermediate terms and different specific terms levels, thereby providing a third, pathway for locating and selecting one or more actual physical products associated with the one or more of the received plurality of construction detail components;

for hosting from the project management application service via the communications network for one or more other network devices each with one or more other processors, the created first, second and third set of electronic indexes;

for providing from the project management application service via the communications network to the one or more other network devices, the first, one-to-many, general-to-specific, electronic pathway and the second, many-to-one, specific-to-general, electronic pathway, for locating and selecting one or more virtual construction detail components from the one or more other network devices via the communications network; and for providing from the project management application service via the communications network to the one or more other network devices, the third electronic pathway, for locating and selecting from the one or more other network devices via the communications network, one or more actual physical products associated with the one or more of the received plurality of construction detail components, from outside of the XD modeling program via a web-service or website via the communications network, or from directly within the XD modeling program.

\* \* \* \* \*